(12) United States Patent
Gallegos et al.

(10) Patent No.: US 10,172,016 B2
(45) Date of Patent: Jan. 1, 2019

(54) GENERATION OF ACCESS POINT CONFIGURATION CHANGE BASED ON A GENERATED COVERAGE MONITOR

(75) Inventors: Fabiel Zuniga Gallegos, Roseville, CA (US); Allan Delgado Campos, San Jose, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 565 days.

(21) Appl. No.: 14/411,090

(22) PCT Filed: Jun. 29, 2012

(86) PCT No.: PCT/US2012/044762
§ 371 (c)(1),
(2), (4) Date: Dec. 23, 2014

(87) PCT Pub. No.: WO2014/003770
PCT Pub. Date: Jan. 3, 2014

(65) Prior Publication Data
US 2015/0327122 A1    Nov. 12, 2015

(51) Int. Cl.
*H04W 16/20* (2009.01)
*H04W 28/18* (2009.01)
*H04W 16/18* (2009.01)
*H04W 16/08* (2009.01)
*H04W 24/02* (2009.01)
*H04W 84/12* (2009.01)

(52) U.S. Cl.
CPC ........... *H04W 16/20* (2013.01); *H04W 16/08* (2013.01); *H04W 16/18* (2013.01); *H04W 28/18* (2013.01); *H04W 24/02* (2013.01); *H04W 84/12* (2013.01)

(58) Field of Classification Search
CPC .................................................... H04W 16/20
See application file for complete search history.

(56) References Cited

U.S. PATENT DOCUMENTS

| 7,162,250 | B2 | 1/2007 | Misra |
| 7,609,650 | B2 | 10/2009 | Roskowski et al. |
| 2005/0059405 | A1 | 3/2005 | Thomson et al. |
| 2008/0075051 | A1 | 3/2008 | Dundar et al. |
| 2009/0143018 | A1 | 6/2009 | Anderson et al. |

(Continued)

FOREIGN PATENT DOCUMENTS

| EP | 1523131 A2 | 4/2005 |
| EP | 2456251 | 5/2012 |

(Continued)

OTHER PUBLICATIONS

PCT/ISA/KR, International Search Report dated Jan. 29, 2013, PCT/US2012/044762, 10pps.

(Continued)

*Primary Examiner* — Jason E Mattis
(74) *Attorney, Agent, or Firm* — Hewlett Packard Enterprise Patent Department

(57) ABSTRACT

At least one example disclosed herein relates to determining if a change to a wireless network configuration should be determined. If it is determined that the change to the wireless network should be determined, a plurality of coverage monitors are generated within a site model, each coverage monitor specifying at least one coverage parameter for an associated region of the site model. The change to the wireless network may be determined by identifying a change to a configuration of a wireless access point.

14 Claims, 11 Drawing Sheets

(56) References Cited

U.S. PATENT DOCUMENTS

2010/0057924 A1   3/2010   Rauber et al.
2010/0290397 A1   11/2010   Narayana et al.
2011/0109508 A1   5/2011   Wolman et al.

FOREIGN PATENT DOCUMENTS

GB   2479627   10/2011
KR   20100120924   11/2010
KR   20110111850   10/2011

OTHER PUBLICATIONS

Tzagkarkis, "Trend Forecasting based on Singular Spectrum Analysis of Traffic Workload in a Large-Scale Wireless LAN," Mar. 2009, <http://www.ics.forth.gr/mobile/publications/WLAN_SSA_elsevier.pdf>, 15 pps.

Extended European Search Report, EP Application No. 12880122.2, dated Feb. 25, 2016, pp. 1-10.

GENERATION OF ACCESS POINT CONFIGURATION CHANGE BASED ON A GENERATED COVERAGE MONITOR

BACKGROUND

An electronic device with wireless communication capabilities, such as a desktop or notebook computer, tablet computer, or smart device, may wirelessly connect to a computer network via a wireless access point (WAP). In such examples, the electronic device may connect to the network via the WAP when it is within the transmission range of the WAP. In some examples, a plurality of WAPs located around a site, such as an office or school, may provide wireless access to the network from many locations within the site.

BRIEF DESCRIPTION OF THE DRAWINGS

The following detailed description references the drawings, wherein.

DETAILED DESCRIPTION

Figure 1A:
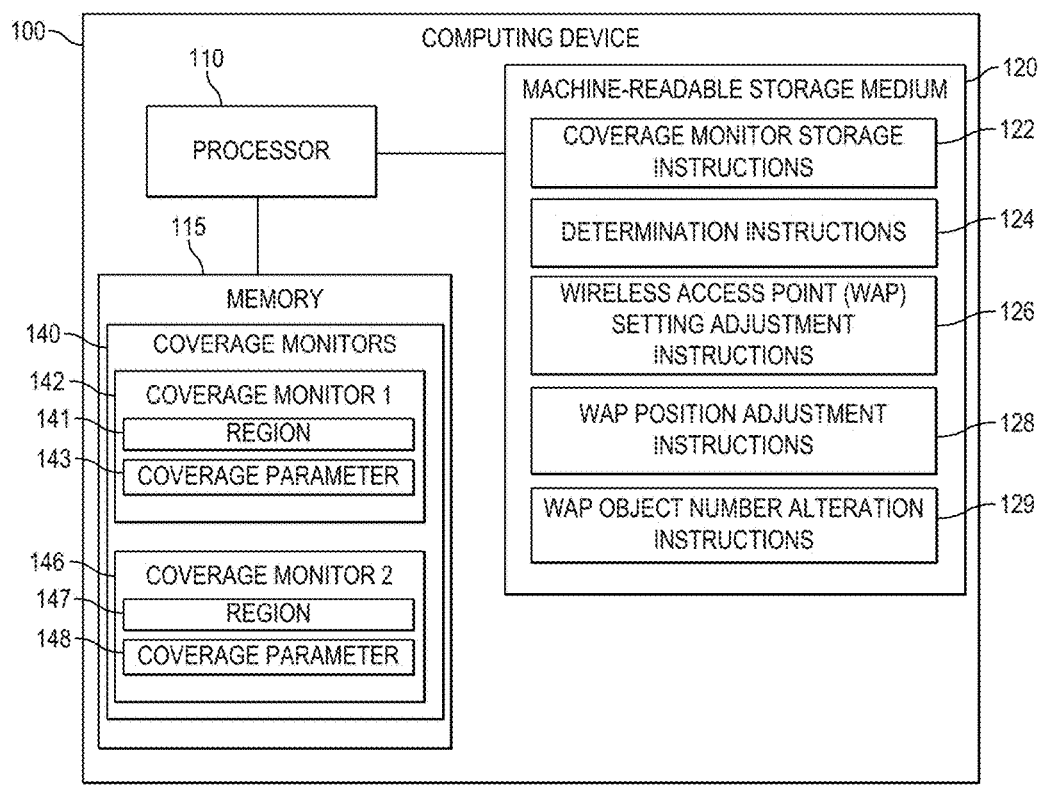
FIG. 1A is a block diagram of an example computing device to adjust wireless access point (WAP) settings and positions.

As noted above, a plurality of wireless access points (WAPs) may be located around a site, such as an office or school. The respective locations of the WAPs may be chosen such that the WAPs provide wireless coverage to each desired location within the site. The locations may be chosen manually, or with the assistance of an automated placement tool. Such automated tools may receive as input the boundaries of an area to cover and signal attenuation attributes of the area. From this input, such tools may calculate a number of WAPs to provide in the area and the locations at which to place the WAPs. In some scenarios, however, the automated tools may not take into account a current placement of WAPs in a site, and as a result may return a number and placement of WAPs that is very different than the current placement. As such, implementing the suggested WAP arrangement may result in unnecessary physical relocation of WAPs, unnecessary addition of WAPs, or both.

To address these issues, examples described herein may seek to determine when a change to a configuration of a wireless network should be determined. The determination to change the configuration may be made based analysis of historical information from one or more WAPS. For example, if analysis of the historical information identifies underusage or overuseage of WAPs, a change in configuration of a wireless network may be determined. If a determination is made to change the configuration, coverage monitors may be generated based on the historical information. A satisfactory arrangement of WAPs at a site based on the generated coverage monitors by adjusting WAP setting values, e.g., transmit power values, etc., for a current set of WAP objects representing WAPs in a model of the site. If a satisfactory WAP arrangement is not found by adjusting WAP settings, examples described herein may adjust respective positions of the WAP objects in the site model, and subsequently alter the number of WAP objects in the site model if a satisfactory WAP arrangement is not found after adjusting WAP positions. In some examples, this process may be repeated iteratively to identify a satisfactory WAP arrangement.

In this manner, by first adjusting WAP setting values, examples described herein may identify a satisfactory arrangement for a current set of WAPs in their current positions at a site. In such examples, implementing this arrangement may involve no physical relocation of WAPs or addition of new WAPs, which may result in savings in time, cost and effort. Alternatively, by subsequently adjusting WAP position values, examples described herein may identify a satisfactory arrangement for the current set of WAPs in different positions. In such examples, the satisfactory WAP arrangement may be implemented using existing resources, which may save the cost of obtaining and deploying new WAPs. As such, examples described herein may seek to identify a satisfactory WAP arrangement with a different number of WAPs after failing to identify a satisfactory arrangement of the current set of WAPs, which may result in savings used to improve the coverage of a network having WAPs in place at a site.

Referring now to the drawings, FIG. 1A is a block diagram of an example computing device 100 to adjust wireless access point (WAP) settings and positions. As used herein, a "computing device" may be a server, a desktop or notebook computer, a computer networking device, or any other device or equipment including a processor. In the example of FIG. 1A, computing device 100 includes a processor 110, a memory 115, and a machine-readable storage medium 120 encoded with instructions 122, 124, 126, 128, and 129. In some examples, storage medium 120 may include additional instructions. In other examples, instructions 122, 124, 126, 128, 129, and any other instructions described herein in relation to storage medium 120 may be stored remotely from computing device 100.

As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof. Processor 110 may fetch, decode, and execute instructions stored on storage medium 120 to implement the functionalities described below. In other examples, the functionalities of any of the instructions of storage medium 120 may be implemented in the form of electronic circuitry, in the form of executable instructions encoded on a machine-readable storage medium, or a combination thereof.

As used herein, a "machine-readable storage medium" may be any electronic, magnetic, optical, or other physical storage device to contain or store information such as executable instructions, data, and the like. For example, any machine-readable storage medium described herein may be any of Random Access Memory (RAM), flash memory, a storage drive (e.g., a hard disk), a Compact Disc Read Only Memory (CD-ROM), and the like, or a combination thereof. Further, any machine-readable storage medium described herein may be non-transitory. In the example of FIG. 1A, memory 115 may be a machine-readable storage medium. In some examples, memory 115 may be separate from storage medium 120. In other examples, memory 115 may be part of storage medium 120.

In some examples, instructions 122 may store a site model in memory 115. As used herein, a "site model" is a collection of information including a plurality of site characteristics defining a representation of an actual environment or an environment design. In some examples, site characteristics may include a definition of the outer boundaries of the environment of the site model. In some examples, site characteristics may also include boundaries of at least one inner portion of the environment. Site characteristics may also include, for example, at least one of the predicted signal attenuation for at least a portion of the environment, and the location and signal attenuating properties of at least one object in the environment. In some examples, site characteristics may further define a plurality of regions within the outer boundaries of the environment, and each of the regions may have at least one associated site characteristic.

In the example of FIG. 1A, instructions 122 may also store, in memory 115, a plurality of coverage monitors 140 for the site model. In some examples, the plurality of coverage monitors 140 may include at least a coverage monitor 142 and a coverage monitor 146. As used herein, a "coverage monitor" is a collection of information defining the location and boundaries of a region within the site model, and specifying at least one coverage parameter for the associated region. Coverage monitor 142 may define an associated region 141 and include at least one coverage parameter 143 for associated region 141. As used herein, the region defined by a coverage monitor may be referred to as an "associated region" of the coverage monitor. Coverage monitor 146 may define an associated region 147 and include at least one coverage parameter 148 for associated region 147.

In some examples, the site model may include at least one WAP object. In other examples, after storing the site model in memory 115, instructions 122 may receive at least one WAP object input by a user, for example. Alternatively, WAP objects may be determined based on analysis of historical information received from WAPs within the network, including the type, configuration, and position of the WAP. In response, instructions 129 may add the received WAP objects to the site model stored in memory 115. As used herein, a "wireless access point (WAP) object" of a site model is a collection of information representing a wireless access point and thus, the terms WAP object and WAP may be used interchangeably herein. In some examples, a WAP object may specify characteristics of the WAP object, such as its current location within the site model, predicted signal transmission and reception capabilities, and at least one WAP setting, such as a channel and a transmit power for the WAP object. In some examples, a WAP object may represent an actual or designed WAP and the characteristics defined by the WAP object may represent corresponding characteristics of the WAP. As used herein, a "wireless access point (WAP)" is an electronic device comprising at least one radio for wirelessly sending and receiving communications to and from a remote electronic device to wirelessly connect the remote electronic device to a computer network. In some examples, the WAP objects of a site model may represent a proposed or actual placement of WAPs in an environment represented by the site model.

In the example of FIG. 1A, instructions 124 may derive an initial WAP configuration from the WAP objects of the site model. As used herein, a "WAP configuration" for at least one WAP object is a collection of information including, for each of the WAP objects, at least one WAP setting value for the WAP object and at least one WAP position value for the WAP object. In some examples, WAP settings for a WAP object may include, for example, transmit power, channel, or any other adjustable characteristic of a WAP. In such examples, a WAP setting value may be a value for a WAP setting (e.g., a transmit power value, a channel number, etc.). As used herein, a WAP position value for a WAP object may be a value to indicate, alone or in combination with at least one other value, a position for the WAP object within the site model containing the WAP object. In some examples, the site model may be modeled in the first quadrant of a Cartesian coordinate system. In such examples, WAP position values for a WAP object may include an x-axis coordinate and a y-axis coordinate representing a position for the WAP object in the site model. In some examples, instructions 124 may create initial WAP configuration for WAP objects of the site model by retrieving at least one WAP setting value (e.g., a transmit power value) and WAP position values (e.g., x and y coordinates) included in each of the WAP objects.

In some examples, instructions 124 may generate an initial coverage prediction for the initial WAP configuration. As used herein, a "coverage prediction" for a WAP configuration for a plurality of WAP objects is a prediction of at least the coverage area that would be provided by a plurality of WAPs represented by the WAP objects, respectively, and having the WAP setting values and WAP position values specified by the WAP configuration for the WAP objects. In some examples, the coverage prediction for a WAP configuration for a plurality of WAP objects may include a predicted coverage area for each of the WAP objects included in the WAP configuration. The predicted coverage area for a WAP object may be a prediction of at least the coverage area that would be provided by a WAP represented by the WAP object and having the WAP setting values and WAP position values specified by the WAP configuration for the WAP object. In some examples, WAP setting values specified by the WAP objects may be used to generate the coverage prediction if values for those WAP settings are not specified in the WAP configuration. Additionally, as used herein, a "coverage area" represents an area within which a WAP may communicate wirelessly with another electronic device. In some examples, a coverage prediction for a WAP configuration may further include a prediction of the quality of service provided within the coverage area.

In the example of FIG. 1A, instructions 124 may determine, with processor 110, if the initial coverage prediction for the WAP configuration for a set of WAP objects satisfies each coverage parameter of each coverage monitor of the plurality of coverage monitors 140. As used herein, a "coverage parameter" for a coverage monitor is information identifying a wireless coverage characteristic to be met in the region associated with the coverage monitor. For example coverage parameters may include coverage type parameters, which specify a type of coverage to be provided in the associated region of the coverage monitor to satisfy the coverage parameter. Such coverage type parameters may include, for example, a full-coverage parameter, a no-coverage parameter, and a selective coverage parameter. Other example coverage parameters may include signal quality parameters specifying, for example, at least one of a minimum, maximum, or average signal level to be met in the associated region of the coverage monitor including the parameter.

As used herein, a "full-coverage parameter" is a coverage parameter that is satisfied by any coverage prediction having a predicted coverage area including the entire region associated with a coverage monitor including the full-coverage parameter. As used herein, a "no-coverage parameter" is a coverage parameter that is satisfied by any coverage prediction having a predicted coverage area excluding the entire region associated with a coverage monitor including the no-coverage parameter. As used herein, a "selective coverage parameter" is a coverage parameter that is satisfied by any coverage prediction. For example, the selective coverage parameter may be satisfied if a predicted coverage area includes some, all, or none of the region associated with the coverage monitor including the selective coverage parameter. In this manner, the selective coverage parameter may be associated with a region in which coverage may be provided, and in which partial or no coverage is also acceptable.

In some examples, instructions 124 may compare the initial coverage prediction to each coverage parameter of each of the coverage monitors 140 for the site model to determine whether the coverage prediction satisfies each of the coverage parameters. In the example of FIG. 1A, instructions 124 may compare the initial coverage prediction to each of at least coverage parameters 143 and coverage parameters 148 of coverage monitors 142 and 146, respectively. Instructions 124 may determine that the coverage prediction satisfies a full-coverage parameter of a coverage monitor if a predicted coverage area of the coverage prediction includes the entire region associated with the coverage monitor. Instructions 124 may determine that a coverage prediction satisfies a no-coverage parameter of a coverage monitor if a predicted coverage area of the coverage prediction excludes the entire region associated with the coverage monitor. Instructions 124 may determine that any coverage prediction satisfies a selective coverage parameter of a coverage monitor regardless of whether the coverage prediction includes any of the region associated with the coverage monitor.

In some examples, to determine whether a coverage prediction satisfies each coverage parameter of each coverage monitor, instructions 124 may utilize a plurality of variables, such as coverage monitor incompliance level (CMIL) and site coverage incompliance level (SCIL). As used herein, a "coverage monitor incompliance level (CMIL)" for a given coverage monitor and a given coverage prediction is the percentage of the region associated with the coverage monitor for which the coverage prediction fails to satisfy at least one coverage parameter of the coverage monitor. Additionally, as used herein, a "site coverage incompliance level (SCIL)" for a given site and a given coverage prediction is the average CMIL for all of the coverage monitors of the site for the given coverage prediction. In some examples, instructions 124 may determine that a coverage prediction satisfies each coverage parameter of each of the coverage monitors 140 if the SCIL for the coverage prediction is zero. Instructions 124 may determine that a coverage prediction fails to satisfy at least one coverage parameter of at least one of coverage monitors 140 if the SCIL for the coverage prediction is not zero.

In the example of FIG. 1A, if instructions 124 determine that the initial coverage prediction satisfies each coverage parameter of each of the plurality of coverage monitors 140 (e.g., the SCIL for the initial coverage prediction is zero), then instructions 124 may identify the set of WAP objects of the site model and the initial WAP configuration as a satisfactory WAP arrangement for the site model. As used herein, a "satisfactory WAP arrangement" for a site model is a set of WAP objects and a WAP configuration for the set of WAP objects, wherein a coverage prediction based on the WAP objects and WAP configuration satisfies each coverage parameter of each coverage monitor of the site model. In some examples, the satisfactory WAP arrangement may identify a placement and collection of setting values for at least one WAP that may satisfy the desired coverage for the site represented by the coverage monitors of the site model.

Alternatively, if instructions 124 determine that the initial coverage prediction for the initial WAP configuration fails to satisfy at least one coverage parameter of at least one of the coverage monitors 140 (e.g., the SCIL is not zero), then instructions 126 may iteratively adjust at least one WAP setting value for the set of WAP objects to generate at least one first trial WAP configuration. In some examples, instructions 126 may iteratively adjust at least one of the WAP setting values to generate a plurality of first trial WAP configurations.

In some examples, instructions 124 may generate a coverage prediction for each of the first trial WAP configurations generated by instructions 126 and determine, for each of the coverage predictions, whether the coverage prediction satisfies each coverage parameter of each of the coverage monitors 140 (e.g., whether the SCIL is zero). Instructions 126 may continue to iteratively generate first trial WAP configurations until either instructions 124 determine that a coverage prediction for one of the generated first trial WAP configurations satisfies each coverage parameter of each of the coverage monitors 140 (e.g., the SCIL is zero), or a threshold number of iterations have been completed without determining that a coverage prediction for any of the generated first trial WAP configurations satisfies each coverage parameter.

In some examples, instructions 126 may generate each of the first trial WAP configurations by iteratively generating a new first trial WAP configuration from a preceding WAP configuration. For example, to generate each new first trial WAP configuration, instructions 126 may generate a first trial WAP configuration that is the same as the preceding WAP configuration except that at least one WAP setting value (e.g., a transmit power value) for at least one of the WAP objects of the site model is adjusted relative to the preceding WAP configuration. Any non-adjusted WAP setting may be the same in the new WAP configuration and the preceding WAP configuration. In some examples, generating a new first trial WAP configuration may include generating an adjusted WAP setting value for at least one WAP setting (e.g., transmit power) of each WAP object. In some examples, instructions 126 may start generating first trial WAP configurations from the initial WAP configuration by using the initial WAP configuration as the preceding WAP configuration in a first iteration.

In some examples, each WAP setting value adjustment between consecutive WAP configurations may be an increase or decrease of the value within the allowed range for the value. In some examples, the amount of the adjustment may be determined heuristically. For example, instructions 126 may, at each iteration, choose an adjusted value for the transmit power for at least one of the WAP objects via a random or pseudo-random process. In such examples, to adjust a transmit power value of a preceding WAP configuration, instructions 126 may randomly or pseudo-randomly select an increment value in the range [−C, (M−C)], where "C" is the preceding transmit power value (i.e., the value in the preceding WAP configuration), and "M" is the maximum valid transmit power value (e.g., 22 dBm). In such examples, applying (e.g., adding) this increment value to the preceding value will not adjust the transmit power value outside of a valid range for the transmit value (e.g., 0 dBm-22 dBm).

In some examples, instructions 126 may generate an adjusted value for the transmit power by adding a scaled increment value to the preceding value. Instructions 126 may generate a scaled increment value by multiplying the previously determined increment value by the preceding SCIL (i.e., the SCIL determined for the preceding WAP configuration), where the SCIL is normalized to be in the range [0, 1]. In such examples, smaller increments may be applied when the preceding SCIL is closer to zero. Instructions 126 may generate the adjusted transmit power value by adding the scaled increment value to the preceding transmit power value. In other examples, instructions 126 may adjust other WAP setting values in addition to or as an alternative to transmit power values in the same manner. In some examples, each first trial WAP configuration may specify at least a transmit power value for each of the WAP objects. Additionally, in some examples, each first trial WAP configuration may specify at least a transmit power value and at least one WAP position value for each WAP object.

Additionally, in some examples, the iterative process of generating first trial WAP configurations and evaluating coverage predictions for the trial first WAP configurations may be implemented using a hill-climbing optimization technique (e.g., utilizing various processes described above) or another heuristic-based iterative technique. For example, a hill-climbing optimization technique may include an assessment procedure, a selection procedure, and a modification procedure. In such examples, utilizing a hill-climbing optimization technique may include determining an SCIL for a coverage prediction in the assessment procedure, selecting a preceding WAP configuration having a coverage prediction with a lowest SCIL among the preceding WAP configurations in the selection procedure, and generating a new WAP configuration from the selected WAP configuration (i.e., the "preceding" WAP configuration) in the modification procedure.

In the example of FIG. 1A, if instructions 124 determine that a coverage prediction for any of the first trial WAP configurations generated by instructions 126 satisfies each coverage parameter of each of the plurality of coverage monitors 140 (e.g., has an SCIL of zero), then instructions 124 may identify the set of WAP objects and the corresponding first trial WAP configuration as a satisfactory WAP arrangement for the site model. In such examples, instructions 126 may cease iteratively generating first trial WAP configurations. Alternatively, instructions 126 may cease iteratively generating first trial WAP configurations if a threshold number of first trial WAP configurations have been generated without instructions 124 determining that a coverage prediction for any of the generated first trial WAP configurations satisfies each coverage parameter of the coverage monitors 140.

If respective coverage predictions for the first trial WAP configurations each fail to satisfy at least one of the coverage parameters of the coverage monitors 140, instructions 128 may iteratively adjust at least one WAP position value for the set of WAP objects to generate at least one second trial WAP configuration. In some examples, instructions 128 may iteratively adjust at least one WAP position value to generate a plurality of second trial WAP configurations. Instructions 124 may generate a coverage prediction for each of the second trial WAP configurations generated by instructions 128 and determine, for each of the coverage predictions, whether the coverage prediction satisfies each coverage parameter of each of the coverage monitors 140 (e.g., whether the SCIL is zero). Instructions 128 may continue to iteratively generate second trial WAP configurations until either instructions 124 determine that a coverage prediction for one of the generated second trial WAP configurations satisfies each coverage parameter of each of the coverage monitors 140 (e.g., the SCIL is zero), or a threshold number of iterations have been completed without determining that a coverage prediction for any of the generated second trial WAP configurations satisfies each coverage parameter.

In some examples, instructions 128 may generate each of the second trial WAP configurations by iteratively generating a new second trial WAP configuration from a preceding WAP configuration. For example, to generate each new second trial WAP configuration, instructions 128 may generate a second trial WAP configuration that is the same as the preceding WAP configuration except that at least one WAP position value (e.g., an x-axis coordinate or a y-axis coordinate) for at least one of the WAP objects of the site model is adjusted relative to the preceding WAP configuration. Any non-adjusted WAP position value may be the same in the new WAP configuration and the preceding WAP configuration. In some examples, generating a new second trial WAP configuration may include generating adjusted WAP position values (e.g., x and y-axis coordinates) for each WAP object. In some examples, instructions 128 may start generating second trial WAP configurations from a selected first trial WAP configuration having a coverage prediction with a lowest SCIL among all the coverage predictions determined for the first trial WAP configurations. In such examples, instructions 128 may use the selected first trial WAP configuration as the preceding WAP configuration in the first iteration.

In some examples, instructions 128 may generate each adjusted WAP position value as described above in relation to generating adjusted WAP setting values with instructions 126. For example, instructions 128 may determine the amount of each value adjustment heuristically. In some examples, instructions 128 may, at each iteration, choose an adjusted value for the x-axis coordinate for at least one of the WAP objects via a random or pseudo-random process. In such examples, to adjust an x-axis coordinate for a WAP object in a preceding WAP configuration, instructions 128 may randomly or pseudo-randomly select an increment value in the range [−X, (W−X)], where "X" is the x-axis coordinate value in the preceding WAP configuration, and "W" is the maximum valid x-axis value (e.g., the width of the site model). In such examples, applying (e.g., adding) this increment value to the preceding value will not adjust the x-axis coordinate value outside of a valid range for x-axis coordinate value (e.g., 0−W). Instructions 128 may then generate a scaled increment value by multiplying the previously determined increment value by the preceding SCIL (i.e., the SCIL determined for the preceding WAP configuration) where the SCIL is normalized to be in the range [0, 1], as described above in relation to instructions 126. Instructions 128 may then generate an adjusted value for the x-axis coordinate by adding the scaled increment value to the preceding value for the x-axis coordinate.

In some examples, instructions 128 may also adjust the y-axis coordinates for WAP objects as described above in relation to adjusting x-axis coordinates, except that instructions 128 select the increment value in the range [−Y, (L−Y)], where "Y" is the y-axis coordinate value in the preceding WAP configuration, and "L" is the maximum valid y-axis value (e.g., the length of the site model). In some examples, instructions 128 may adjust both the x-axis coordinate and the y-axis coordinate for each WAP object, as described above, at each iteration of generating a new second trial WAP configuration from a preceding WAP configuration. In some examples, each second trial WAP configuration may specify at least a transmit power value and x-axis and y-axis values for each WAP object.

Additionally, in some examples, the iterative process of generating second trial WAP configurations and evaluating coverage predictions for the trial second WAP configurations may be implemented using a hill-climbing optimization technique (e.g., utilizing various processes described above) or another heuristic-based iterative technique. For example, utilizing a hill-climbing optimization technique may include determining an SCIL for a coverage prediction in the assessment procedure, selecting a preceding WAP configuration having a coverage prediction with a lowest SCIL among the preceding WAP configurations in the selection procedure, and generating a new WAP configuration from the selected WAP configuration (i.e., the "preceding" WAP configuration) in the modification procedure.

If instructions 124 determine that a coverage prediction for any of the second trial WAP configurations generated by instructions 128 satisfies each coverage parameter of each of the plurality of coverage monitors 140 (e.g., has an SCIL of zero), then instructions 124 may identify the set of WAP objects and the corresponding second trial WAP configuration as a satisfactory WAP arrangement for the site model. In such examples, instructions 128 may cease iteratively generating second trial WAP configurations. Alternatively, instructions 128 may cease iteratively generating second trial WAP configurations if a threshold number of second trial WAP configurations have been generated without instructions 124 determining that a coverage prediction for any of the generated second trial WAP configurations satisfies each coverage parameter.

If respective coverage predictions for the second trial WAP configurations generated by instructions 128 each fail to satisfy at least one of the coverage parameters of the coverage monitors 140, instructions 129 may alter the number of WAP objects in the set of WAP objects in the site model. As used herein, to "alter" the number of WAP objects in a set of WAP objects is to add at least one new WAP object to the set of WAP objects or remove at least one WAP object from the set of WAP objects.

In some examples, if the respective coverage predictions for the second trial WAP configurations each fail to satisfy at least one of the coverage parameters, instructions 124 may select the second trial WAP configuration associated with the second coverage prediction having the greatest level of compliance with the coverage monitors 140 among the coverage predictions for the second trial WAP configurations generated by instructions 128. The coverage prediction having the greatest level of compliance may be, for example, the coverage prediction having a lowest SCIL. As used herein, a WAP configuration "associated with" a coverage prediction is the WAP configuration from which the coverage prediction is generated. Instructions 124 may subsequently identify the coverage monitor, among the plurality of coverage monitors 140, that is least satisfied by the coverage prediction for the selected second trial WAP configuration. In some examples, the least satisfied coverage monitor may be the coverage monitor having a highest CMIL in relation to the coverage prediction for the selected trial WAP configuration.

In some examples, if the identified coverage monitor having the highest CMIL includes a full-coverage parameter, instructions 129 may add another WAP object to the set of WAP objects of the site model to thereby generate a new set of WAP objects. If the identified coverage monitor having the highest CMIL includes a no-coverage parameter, instructions 129 may remove one of the WAP objects from the set of WAP objects of the site model to thereby generate a new set of WAP objects. In some examples, instructions 124 may determine whether the set of WAP objects in the site model is empty. If instructions 124 determine that the set of WAP objects is empty, then instructions 129 may alter the number of WAP objects in the empty set of WAP objects by adding a new WAP object to the set to generate a new, non-empty set of WAP objects.

In some examples, after instructions 129 alter the number of WAP objects to generate the new set of WAP objects, the process described above in relation to instructions 124, 126, 128, and 129 may be repeated until a WAP configuration having a coverage prediction that satisfies each coverage parameter of the coverage monitors 140 is found. For example, after instructions 129 alter the number of WAP objects to generate the new set of WAP objects, instructions 124 may determine whether an initial WAP configuration for the new set of WAP objects satisfies each coverage parameter of each of the coverage monitors 140. In some examples, the initial WAP configuration may be the same as the second trial WAP configuration selected by instructions 129, as described above, along with initial WAP setting values and WAP position values for the new WAP object, if an object is added, or excluding any values for a removed WAP object.

In some examples, instructions 124 may generate a coverage prediction for the initial WAP configuration for the new set of WAP objects and determine whether the coverage prediction satisfies each coverage parameter of the coverage monitors 140 (e.g., has an SCIL of zero). If so, instructions 124 may identify the set of WAP objects of the site model and the initial WAP configuration as a satisfactory WAP arrangement for the site model. Otherwise, instructions 124, 126, 128, and 129 may repeat the process described above for generating and evaluating adjusted WAP setting values, adjusting and evaluating adjusted WAP position values, and altering the number of WAP objects.

For example, if the coverage prediction for the initial WAP configuration for the new set of WAP objects fails to satisfy at least one coverage parameter of at least one of the coverage monitors 140, instructions 126 may iteratively adjust at least one WAP setting value for the new set of WAP objects to generate at least one third trial WAP configuration, as described above in relation to instructions 126. Instructions 124 may generate a coverage prediction for each third trial WAP configuration and determine whether the coverage prediction satisfies each coverage parameter of the coverage monitors 140 (e.g., has an SCIL of zero). If any of the coverage predictions has an SCIL of zero, instructions 124 may identify the set of WAP objects of the site model and the corresponding third trial WAP configuration as a satisfactory WAP arrangement for the site model.

Alternatively, instructions may 126 cease generating third trial WAP configurations after reaching a threshold number of iterations without instructions 124 determining that a coverage prediction for any of the third trial WAP configurations satisfies each of the coverage parameters of the coverage monitors 140. In such examples, instructions 128 may iteratively adjust at least one WAP position value for the new set of WAP objects to generate at least one fourth trial WAP configuration, as described above in relation to instructions 128. Instructions 124 may generate a coverage prediction for each fourth trial WAP configuration and determine whether the coverage prediction satisfies each coverage parameter of the coverage monitors 140 (e.g., has an SCIL of zero). If any of the coverage predictions has an SCIL of zero, instructions 124 may identify the set of WAP objects of the site model and the corresponding fourth trial WAP configuration as a satisfactory WAP arrangement for the site model.

Alternatively, instructions 128 may cease generating fourth trial WAP configurations after reaching a threshold number of iterations without instructions 124 determining that a coverage prediction for any of the fourth trial WAP configurations satisfies each coverage parameter of each of the coverage monitors 140. In such examples, instructions 129 may alter the number of WAP objects in the new set of WAP objects. In some examples, functionalities described herein in relation to FIG. 1A may be provided in combination with functionalities described herein in relation to any of FIGS. 1B-7B.

Figure 1B:
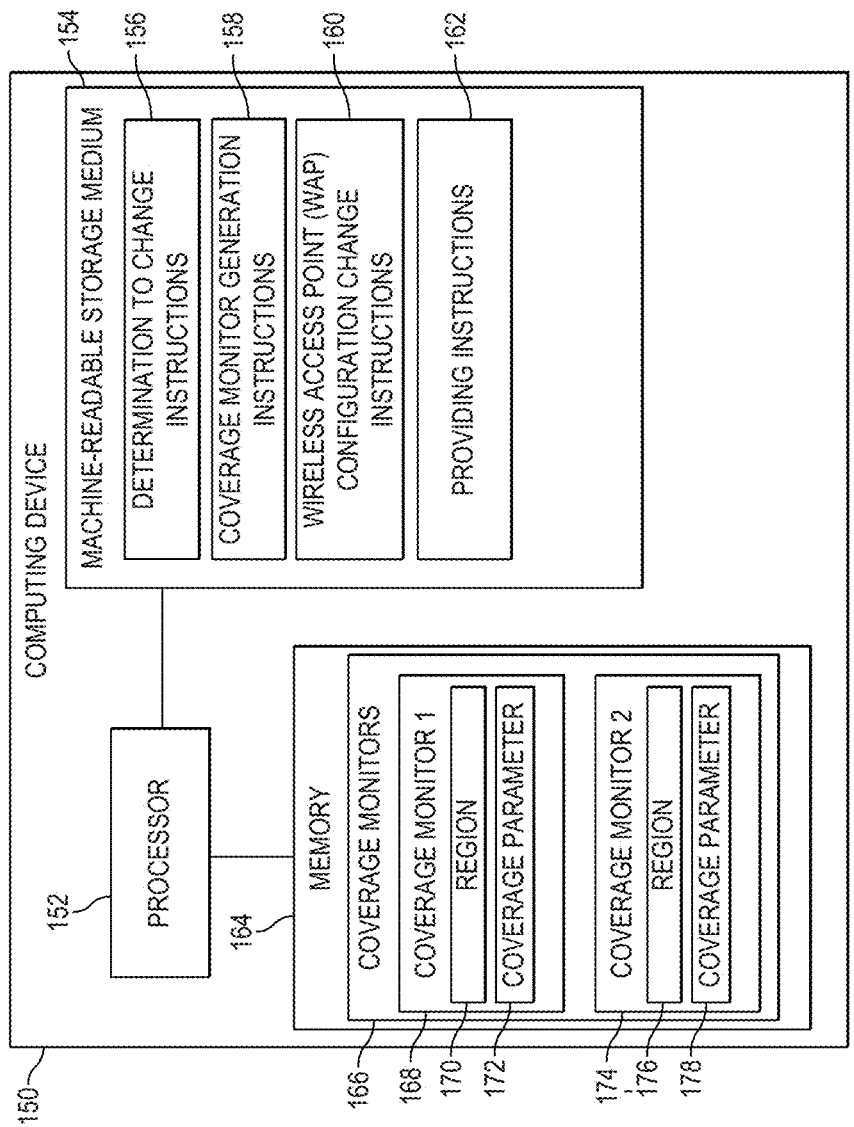
FIG. 1B is a block diagram of an example computing device to determine a change to a wireless network configuration.

FIG. 1B a block diagram of an example computing device to determine a configuration change to a wireless network configuration. As discussed herein, a change to a wireless network configuration may include an internal change to one or more WAPs, e.g., an change in settings of one or more WAPs and/or an external change to one or more WAPs, e.g., a change in position of one or more WAPs.

In the example of FIG. 1B, instructions 156 may determine if a change to a wireless network configuration should be determined. The determination to change a wireless network configuration may be based on an analysis of historical information that is collected from one or more WAPs in a wireless network. The historical information may include information related to misusage events that occur during operation of the wireless network. For example, an underusage event may include activity that falls below a predetermined level within a predetermined time interval, both the predetermined level and the predetermined time interval both as defined by, for example an administrator. The historical information may additionally or alternatively include information related to overusage misusage events that occur during operation of the wireless network. For example, an overusage event may include activity that falls above a predetermined level within a predetermined time interval, both the predetermined level and the predetermined time interval both as defined by, for example an administrator.

In the example in FIG. 1B, instructions 158 may generate a plurality of coverage monitors within a site model. In some examples, the plurality of coverage monitors 166 may include at least a coverage monitor 168 and a coverage monitor 174. Coverage monitor 168 may define an associated region 170 and include at least one coverage parameter 172 for associated region 170. As used herein, the region defined by a coverage monitor may be referred to as an "associated region" of the coverage monitor. Coverage monitor 174 may define an associated region 176 and include at least one coverage parameter 178 for associated region 176. Generation of the coverage monitors are more fully discussed below and includes identifying at least one set of all client devices that are within a predetermined distance, as defined by an administrator, of other client devices that are directly connected to the WAP, identifying a region that includes all of the client devices within the predetermined distance, and specifying at least one coverage parameter for the associated region. The coverage parameters may be determined based on analysis of the historical information.

Instructions 160 may determine the change to the wireless network configuration by identifying a change to a configuration of at least one WAP. The process for identifying the change to the configuration of at least one WAP is more fully discussed below.

Instructions 162 may provide the determined change including the determined change to the configuration of at least one WAP. The determined change may be provided to a computing device, for example, a display device of computing device 150, or a remote computing device, for viewing by an administrator.

In some examples, functionalities described herein in relation to FIG. 1B may be provided in combination with functionalities described herein in relation to any of FIGS. 1A and 2A-7B.

Figure 2A:
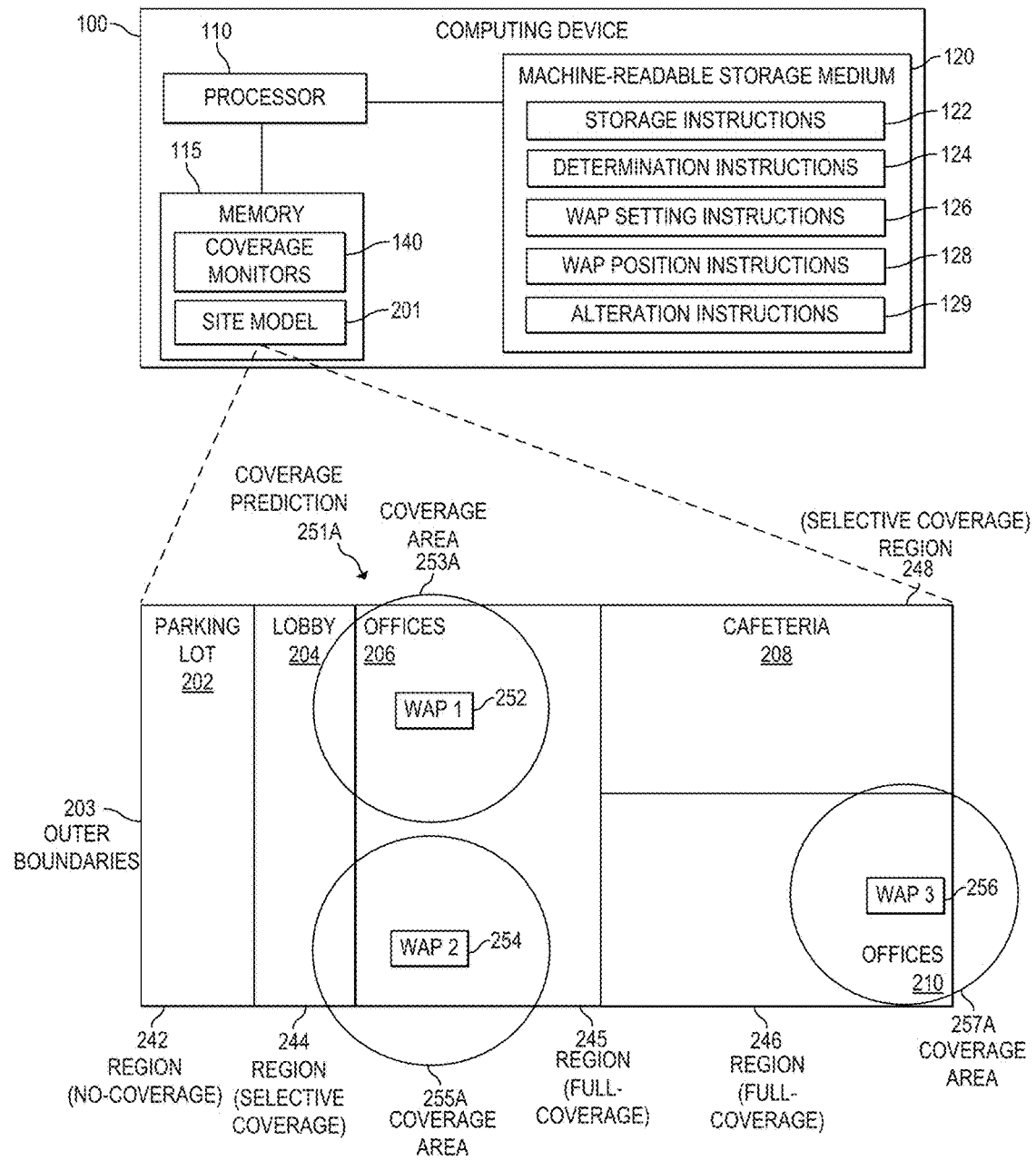
FIG. 2A is a diagram of an example computing device and coverage prediction for a site model including a plurality of WAP objects.

FIG. 2A is a diagram of an example computing device and coverage prediction for a site model including a plurality of WAP objects. In the example of FIG. 2A, computing device 100 may be the same as computing device 100 described above in relation to FIGS. 1A and 1B. In some examples, instructions 122 may store a site model 201 and a plurality of coverage monitors 140 in memory 115. FIG. 2A includes a schematic diagram of site model 201. In the example of FIG. 2A, site model 201 includes a definition of the outer boundaries 203 of the environment represented by the site model, and definitions of the boundaries of a plurality of inner portions, including the boundaries of a parking lot 202, a lobby 204, offices 206, a cafeteria 208, and offices 210 of the environment. In other examples, the site model may include different inner portions, or may not be subdivided into a plurality of inner portions. In some examples, site model 201 may also identify signal attenuation properties for each of the defined inner portions of site model 201. Site model 201 may also include a plurality of WAP objects, including WAP objects 252, 254, and 256.

In the example of FIG. 2A, each of the coverage monitors 140 defines the location and boundaries of a region associated with the coverage monitor. In the example of FIG. 2A, a first coverage monitor of coverage monitors 140 may define an associated region 242 (which may be referred to herein as a coverage monitor region) that is coextensive with parking lot 202. In some examples, the first coverage monitor may include a no-coverage parameter for region 242. A second coverage monitor of coverage monitors 140 may define an associated region 244 that is coextensive with lobby 204. In some examples, the second coverage monitor may include a selective coverage parameter for region 244. A third coverage monitor of coverage monitors 140 may define an associated region 245 that is coextensive with offices 206. In some examples, the third coverage monitor may include a full-coverage parameter for region 245. A fourth coverage monitor of coverage monitors 140 may define an associated region 248 that is coextensive with cafeteria 208, and may include a selective coverage parameter for region 248. A fifth coverage monitor of coverage monitors 140 may define an associated region 246 that is coextensive with offices 210, and may include a full-coverage parameter for region 246.

In the example of FIG. 2A, instructions 124 may generate a coverage prediction 251A based on an initial WAP configuration derived from WAP objects 252, 254, and 256, as described above in relation to FIG. 1A. The predicted coverage area for coverage prediction 251A may include a predicted coverage areas 253A, 255A, and 257A for WAP objects 252, 254, and 256, respectively.

In some examples, instructions 124 may determine whether the generated coverage prediction 251A satisfies each coverage parameter of each of the coverage monitors 140. In the example illustrated in FIG. 2A, the predicted coverage area of coverage prediction 251A excludes the entire region 242. As such, instructions 128 may determine that coverage prediction 251A satisfies the no-coverage parameter for the coverage monitor associated with region 242. In addition, any coverage prediction satisfies the selective coverage parameters of the coverage monitors for regions 244 and 248, so instructions 124 may determine that these parameters are also satisfied by coverage prediction 251A of FIG. 2A. However, the predicted coverage area of coverage prediction 251A excludes portions of regions 245 and 246, so instructions 124 may determine that the full-coverage parameters of the coverage monitors for those regions are not satisfied. Accordingly, instructions 126 may begin iteratively adjusting WAP setting values to generate first trial WAP configurations, as described above in relation to FIG. 1A.

Figure 2B:
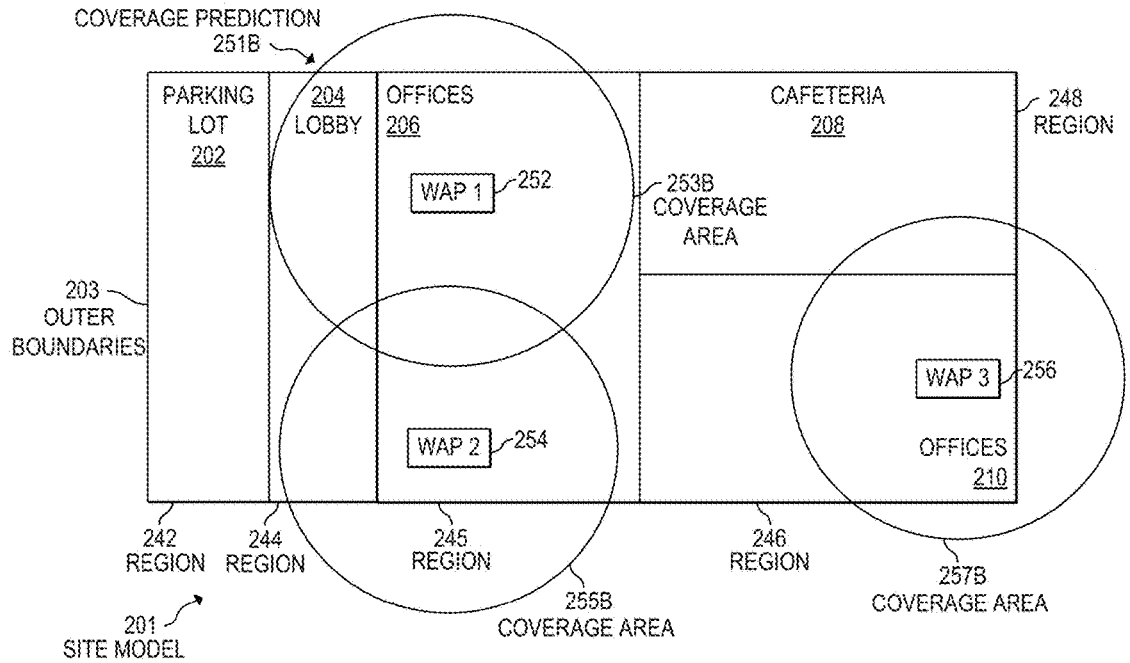
FIG. 2B is a diagram of a site model and a coverage prediction after adjustment of WAP settings for a set of WAP objects of the site model.

FIG. 2B is a diagram of a site model 201 and a coverage prediction 251B after adjustment of WAP settings for a set of WAP objects of the site model. In the example of FIG. 2B, instructions 126 may iteratively adjust at least transmit power values of WAP objects 252, 254, and 256 to generate the first trial WAP configurations. As such, in some examples, instructions 126 may cease iteratively generating first trial WAP configurations when a threshold number of first trial WAP configurations have been generated without instructions 124 determining that a coverage prediction for any of the generated first trial WAP configurations satisfies each coverage parameter of coverage monitors 140.

In some examples, instructions 124 may determine that a coverage prediction 251B is the coverage prediction having the greatest level of compliance with the coverage monitors 140 (e.g., a lowest SCIL) among the coverage predictions for the generated first trial WAP configurations. Instructions 124 may also select for further alteration the first trial WAP configuration associated with coverage prediction 251B in response to determining that coverage prediction 251B has a lowest SCIL. As illustrated in FIG. 2B, coverage prediction 251B has a predicted coverage area that includes predicted coverage areas 253B, 255B, and 257B for WAP objects 252, 254, and 256, respectively. In the example of FIG. 2B, each of coverage areas 253B, 255B, and 257B is greater than corresponding coverage areas 253A, 255A, and 257A of FIG. 2A, resulting from increased transmit power values in the selected first trial WAP configuration from which coverage prediction 251B was generated. However, coverage prediction 251B still does not satisfy the full-coverage parameters of the coverage monitors for regions 245 and 246. Accordingly, instructions 128 may begin iteratively adjusting WAP position values for the WAP objects to generate second trial WAP configurations, as described above in relation to FIG. 1A, starting from the selected first trial WAP configuration.

Figure 2C:
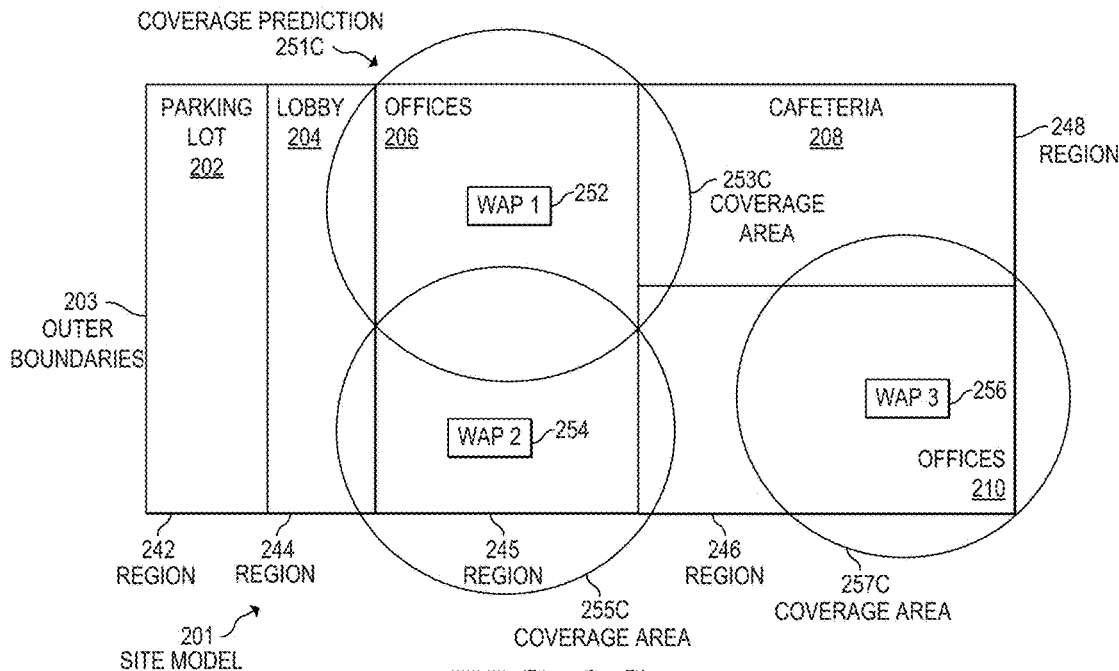
FIG. 2C is a diagram of a site model and a coverage prediction after adjustment of WAP positions for a set of WAP objects of the site model.

FIG. 2C is a diagram of a site model 201 and a coverage prediction 251C after adjustment of WAP positions for a set of WAP objects of the site model. In the example of FIG. 2C, instructions 128 may iteratively adjust WAP position values for at least one WAP object to generate the second trial WAP configurations, as described above, starting from the selected first trial WAP configuration. In some examples, instructions 128 may cease iteratively generating second trial WAP configurations when a threshold number of second trial WAP configurations have been generated without instructions 124 determining that a coverage prediction for any of the generated second trial WAP configurations satisfies each coverage parameter of coverage monitors 140.

In some examples, instructions 124 may determine that a coverage prediction 251C is the coverage prediction having the greatest level of compliance with the coverage monitors 140 (e.g., a lowest SCIL) among the coverage predictions for the generated second trial WAP configurations. As such, in some examples, instructions 124 may also select for further alteration the second trial WAP configuration associated with coverage prediction 251C. As illustrated in FIG. 2C, coverage prediction 251C has a predicted coverage area that includes predicted coverage areas 253C, 255C, and 257C for WAP objects 252, 254, and 256, respectively. In the example of FIG. 2C, coverage area 253C has moved toward region 248, coverage area 255C has moved toward region 246, and coverage area 257C has moved toward region 245, relative to coverage areas 253B, 255B, and 257B of FIG. 2B.

As shown in FIG. 2C, coverage prediction 251C satisfies the full-coverage parameter of the coverage monitor associated with region 245, but still fails to satisfy the full-coverage parameter of the coverage monitor associated with region 246. Accordingly, instructions 129 may alter the number of WAP objects in the set of WAP objects of site model 201, as described above in relation to FIG. 1A.

Figure 2D:
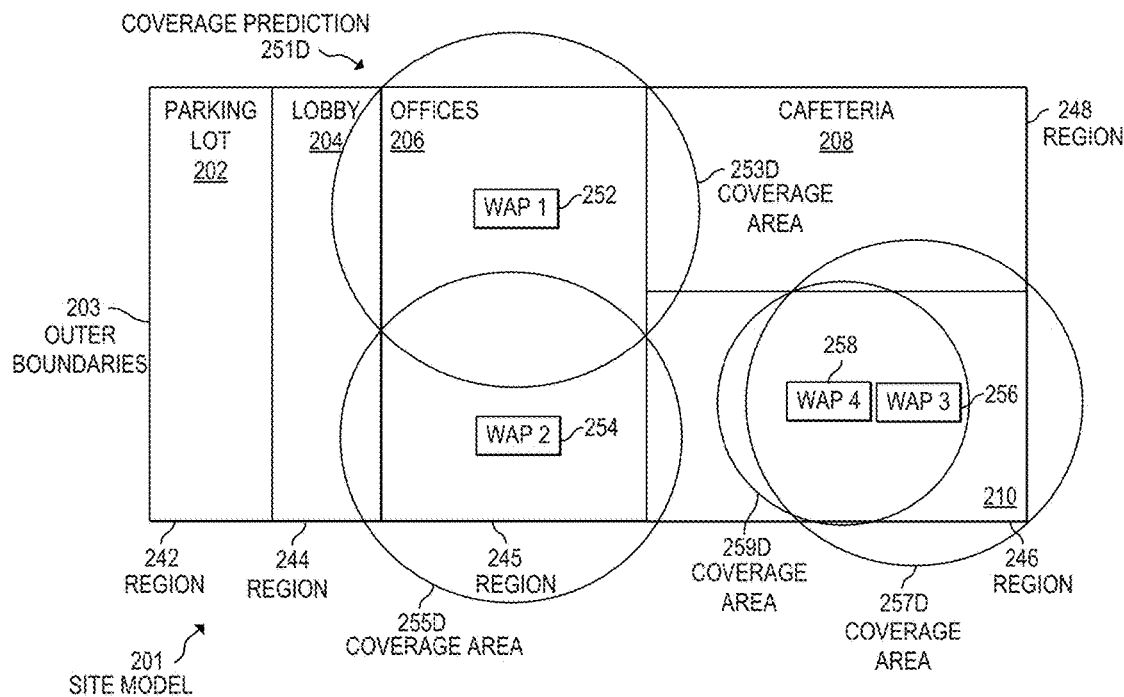
FIG. 2D is a diagram of a site model and a coverage prediction after adding a WAP object to the site model.

FIG. 2D is a diagram of a site model 201 and a coverage prediction 251D after adding a WAP object to the site model. In the example of FIG. 2D, instructions 124 may determine that the coverage monitor that is least satisfied by coverage prediction 251C for the selected second trial WAP configuration (e.g., the coverage monitor having the highest CMIL for coverage prediction 251C) is the coverage monitor associated with region 246. In such examples, instructions 129 may add a new WAP object 258 to the set of WAP objects of site model 201 because the least satisfied coverage monitor includes a full-coverage parameter. In this manner, instructions may generate a new set of WAP objects for site model 201. In some examples, instructions 129 may add the new WAP object to the center of region associated with the least satisfied coverage monitor (e.g., the center of region 246).

In the example of FIG. 2D, instructions 124 may generate a coverage prediction 251D for an initial WAP configuration for the new set of WAP objects. As illustrated in FIG. 2D, coverage prediction 251D has a predicted coverage area that includes predicted coverage areas 253D, 255D, 257D, and 259D for WAP objects 252, 254, 256, and 258, respectively. However, the predicted coverage area of coverage prediction 251D still excludes portions of region 246, so instructions 124 may determine that the full-coverage parameters of the coverage monitors for that region is not satisfied. Accordingly, instructions 126 may begin iteratively adjusting WAP setting values for the new set of WAP objects to generate third trial WAP configurations, as described above in relation to FIG. 1A.

Figure 2E:
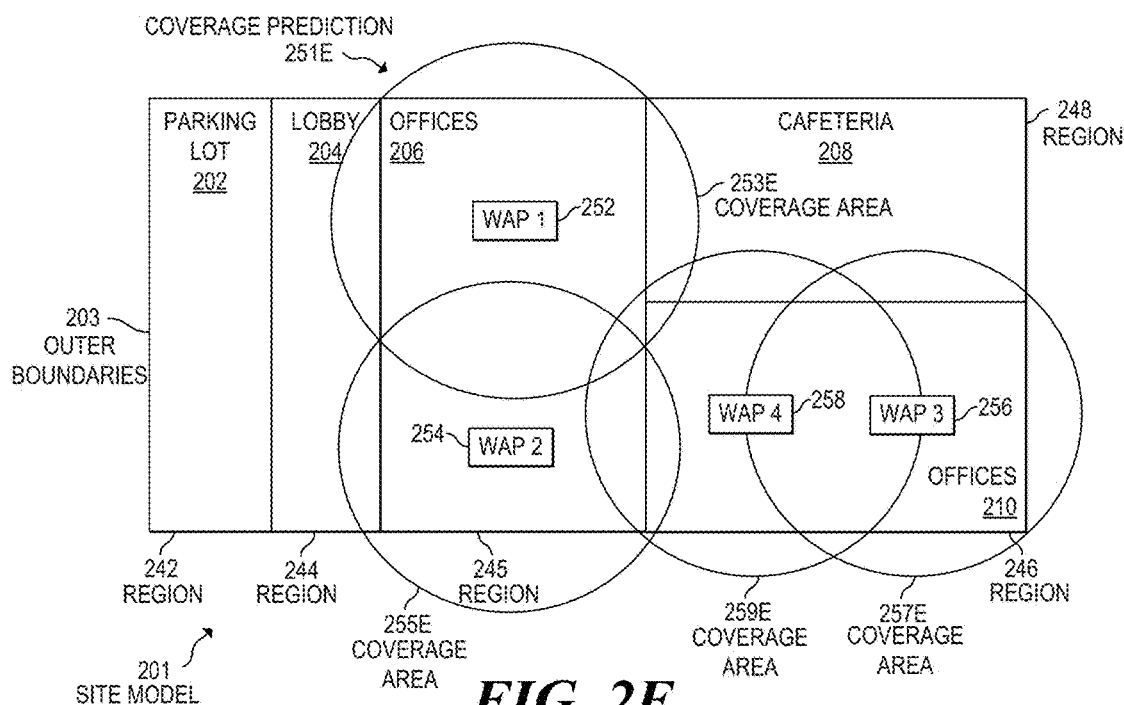
FIG. 2E is a diagram of a site model and a coverage prediction after adjusting WAP settings and WAP positions for a set of WAP objects of the site model.

FIG. 2E is a diagram of a site model 201 and a coverage prediction 251E after adjusting WAP setting values and WAP position values for a set of WAP objects of the site model. In the example of FIG. 2E, instructions 126 may iteratively adjust at least transmit power values to generate third trial WAP configurations. In some examples, each of the coverage predictions for these WAP configurations may fail to satisfy at least one coverage parameter. As such, in some examples, instructions 128 may begin iteratively adjusting WAP position values for the new set of WAP objects to generate fourth trial WAP configurations, as described above in relation to FIG. 1A, starting from a selected one of the third trial WAP configurations.

In the example of FIG. 2E, instructions 124 may generate a coverage prediction for each of the generated fourth trial WAP configurations, including a coverage prediction 251E. As shown in FIG. 2E, the transmit power of WAP object 258 was increased in the selected third trial WAP configuration, and WAP object 258 was moved toward region 245 in the fourth trial WAP configuration from which coverage predictions 251E was generated. In some examples, instructions 124 may determine that coverage prediction 251E satisfies each coverage parameter of each of coverage monitors 140. In such examples, instructions 124 may identify, as a satisfactory WAP arrangement for site model 201, the new set of WAP objects of site model 201 and the fourth trial WAP configuration from which coverage prediction 251E was generated.

Figure 3:
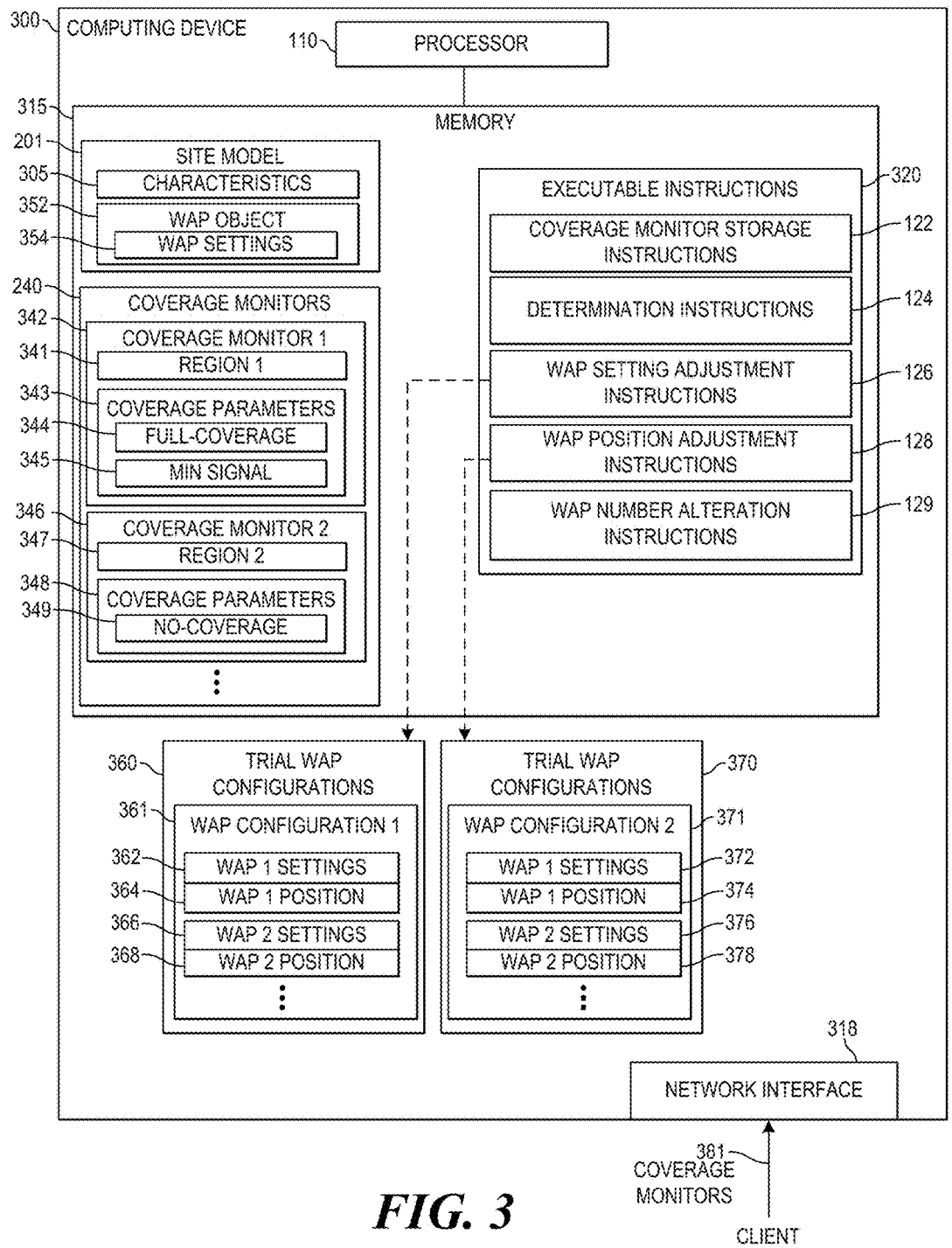
FIG. 3 is a block diagram of an example computing device to add and remove WAP objects from a site model.

FIG. 3 is a block diagram of an example computing device to add and remove WAP objects from a site model. In the example of FIG. 3, computing device 300 may include a processor 110, as described above in relation to FIG. 1A, or 152 as described in relation to FIG. 1B, and a network interface 318. Computing device 300 may also include a memory 315, which may be a machine-readable storage medium. Memory 315 may be encoded with a set of executable instructions 320, including at least instructions 122, 124, 126, 128, and 129, as described above in relation to FIGS. 1-2E. In other examples, executable instructions 320 may include additional instructions. In the example of FIG. 3, processor 110 may fetch, decode, and execute instructions stored on memory 315 to implement the functionalities described below. In other examples, the functionalities of any of the instructions stored on memory 315 may be implemented in the form of electronic circuitry, in the form of executable instructions encoded on a machine-readable storage medium, or a combination thereof.

In the example of FIG. 3, instructions 122 may receive a plurality of coverage monitors 240 via network interface 318 in at least one communication 381 and store the coverage monitors 240 in memory 315. Each of the coverage monitors 240 may specify at least one coverage parameter for an associated region of site model 201. The coverage monitors 240 may be received from a client computing device remote from computing device 300 via network interface 318. In some examples, a user (e.g., an administrator) may input the coverage monitors 240 at the client computing device, which may provide coverage monitors 240 to computing device 300. As used herein, a "network interface" is at least one hardware component that may be used by a computing device to communicate with at least one remote resource of a communications network including at least one computer network, at least one telephone network, or a combination thereof. In some examples, suitable computer networks include, for example, a local area network (LAN), a wireless local area network (WLAN), a virtual private network (VPN), the internet, and the like.

Instructions 122 may also store site model 201 in memory 315. In the example of FIG. 3, site model 201 may include a plurality of site characteristics 305. Site characteristics 305 may include, for example, at least one of outer boundaries for an environment represented by site model 201, boundaries for inner portions of the environment, and signal attenuation properties for at least one of the inner portions of the environment. Site model 201 may also include a set of at least one WAP object 352, each including at least one WAP setting value 354, such as a transmit power value for the WAP object. In some examples, WAP position values for WAP objects 352 may also be included in the respective WAP objects 352. In some examples, the set of WAP objects 352 may be received, with network interface 318, along with or separate from the rest of site model 201. Instructions 122 may also receive, with network interface 318, an initial WAP configuration for the set of WAP objects 352. In some examples, the initial WAP configuration may include at least a transmit power value for each of the WAP objects 352. In some examples, site model 201 and coverage monitors 240 may be stored on a separate machine-readable storage medium from executable instructions 320.

In some examples, coverage monitors 240 may comprise a plurality of coverage monitors for site model 201, including at least a coverage monitor 342 and a coverage monitor 346. In other examples, coverage monitors 240 may include more than two coverage monitors. In the example of FIG. 3, each of coverage monitors 240 includes region information defining a region of site model 201 associated with the coverage monitor and at least one coverage parameter for the associated region. In some examples, each of coverage monitors 240 may include one of the plurality of coverage type parameters described above in relation to FIG. 1A-1B.

In the example of FIG. 3, coverage monitor 342 may include region information 341 defining the region of site model 201 associated with coverage monitor 342, and at least one coverage parameter 343 for the associated region defined by region information 341. Coverage parameters 343 may include at least a coverage type parameter. In the example of FIG. 3, coverage parameters 343 include a full-coverage parameter 344 and a minimum signal parameter 345. In such examples, the minimum signal parameter may include a minimum signal level for the associated region of coverage monitor 342. In other examples, coverage parameters 343 may include other signal quality parameters, such as a maximum or average signal parameter, in addition to or instead of the minimum signal parameter. In some examples, at least one of the coverage monitors 240 may include site information with the region information of the coverage monitor. Such site information may include, for example, the predicted signal attenuation for the region defined by the region information. For example, signals may be attenuated more quickly in some areas (e.g., dense offices) than in other areas (e.g., relatively open spaces). In some examples, such signal attenuation information may be represented by, for example, including a path loss exponent (e.g., 2.0, 3.0, 4.0, etc.) with region information for the associated coverage monitor. For example, region information 341 may include a path loss exponent (e.g., 2.0, 3.0, 4.0, etc.) associated with the region defined by region information 341.

In some examples, instructions 124 may determine that a coverage prediction satisfies a minimum signal parameter if the coverage prediction indicates that the entire region associated with the coverage parameter is predicted to receive at least the minimum signal level (e.g., −70 dBm, −80 dBm, etc.) included in the minimum signal parameter.

Instructions 124 may also determine that a coverage prediction satisfies a maximum signal parameter if the coverage prediction indicates that the entire region associated with the coverage parameter is predicted to receive at most the signal level included in the maximum signal parameter. Instructions 124 may determine that a coverage prediction satisfies an average signal parameter if the coverage prediction indicates that the average signal level predicted for the region associated with the coverage parameter is at least the signal level included in the average signal parameter.

Coverage monitor 346 may include region information 347 defining the region of site model 201 associated with coverage monitor 346, and at least one coverage parameter 348 for the associated region defined by region information 347. Coverage parameter 348 may include at least a coverage type parameter. In some examples, region information 347 may also include site characteristics, such as signal attenuation information for the region defined by region information 347. In the example of FIG. 3, coverage parameters 348 include a no-coverage parameter 349. In other examples, coverage parameters 348 may include at least one signal quality parameter, such as a minimum, maximum, or average signal parameter.

In some examples, instructions 124 may derive the initial WAP configuration from WAP objects 352 of site model 201, as described above in relation to FIGS. 1A-1B. In the example of FIG. 3, instructions 124 may generate an initial coverage prediction for the initial WAP configuration. Instructions 124 may also generate other coverage predictions based on other WAP configurations. In some examples, each coverage prediction generated by instructions 124 may be generated based in part on at least one of site characteristics 305 specified by site model 201 and site characteristics specified by at least one of coverage monitors 240. For example, in making coverage predictions, instructions 124 may take into account at least one predicted signal attenuation specified in site characteristics 305, such as at least one of the predicted signal attenuation for a particular region of the site model and the predicted signal attenuation effects of objects in site model 201. Instructions 124 may also take into account at least one of site characteristics (e.g., predicted signal attenuation) specified by coverage monitors 240, and co-channel interference.

In the example of FIG. 3, instructions 124 may determine if the initial coverage prediction for the initial WAP configuration for the set of WAP objects 352 satisfies each of the plurality of coverage monitors 240, as described above in relation to FIGS. 1A-1B. As used herein, to "satisfy a coverage monitor" is to satisfy each coverage parameter of the coverage monitor. Also, as used herein, to "fail to satisfy a coverage monitor" is to fail to satisfy at least one coverage parameter of the coverage monitor. If instructions 124 determine that the initial coverage prediction satisfies each coverage parameter of each of the plurality of coverage monitors 240 (e.g., the SCIL for the initial coverage prediction is zero), then instructions 124 may identify the set of WAP objects of the site model and the initial WAP configuration as a satisfactory WAP arrangement for the site model.

Alternatively, if instructions 124 determine that the initial coverage prediction for the initial WAP configuration fails to satisfy at least one of the coverage monitors 240 (e.g., the SCIL is not zero), then instructions 126 may iteratively adjust at least one WAP setting value for the set of WAP objects 352 to generate at least one first trial WAP configuration 361, as described above in relation to FIGS. 1A-1B. In some examples, instructions 126 may iteratively adjust at least one WAP setting value to generate a plurality of first trial WAP configurations 360, including at least first trial WAP configuration 361. In the example of FIG. 3, each of first trial WAP configurations 360 may include at least one WAP setting value 362, 366 for each of WAP objects 352 of the site model, and WAP position values 364, 368 (e.g., x-axis and y-axis coordinates) for each of WAP objects 352. In some examples, each first trial WAP configuration 360 may include at least a transmit power value for each of the WAP objects 352. In examples described herein, the transmit power value of a WAP object of a site model may represent a transmit power value for each of the radios of a WAP represented by the WAP object.

In some examples, instructions 124 may generate a coverage prediction for each of the first trial WAP configurations 360 generated by instructions 126 and determine, for each of the coverage predictions, whether the coverage prediction satisfies each of the coverage monitors 240 (e.g., whether the SCIL is zero). As described above in relation to FIGS. 1A-1B, instructions 126 may continue to iteratively generate first trial WAP configurations 360 until either instructions 124 determine that a coverage prediction for one of the generated first trial WAP configurations 360 satisfies each of the coverage monitors 240 (e.g., the SCIL is zero), or a threshold number of iterations have been completed without determining that a coverage prediction for any of the generated first trial WAP configurations 360 satisfies each of the coverage monitors 240.

In the example of FIG. 3, if instructions 124 determine that a coverage prediction for a selected one of the first trial WAP configurations 360 satisfies each of the plurality of coverage monitors 240 (e.g., has an SCIL of zero), then instructions 124 may identify the set of WAP objects and the selected first trial WAP configuration 360 as a satisfactory WAP arrangement for the site model. In such examples, instructions 126 may cease iteratively generating first trial WAP configurations 360.

Alternatively, instructions 126 may cease iteratively generating first trial WAP configurations 360 if a threshold number of first trial WAP configurations have been generated without instructions 124 determining that a coverage prediction for any of the generated first trial WAP configurations 360 satisfies each of the coverage monitors 240. In such examples, instructions 128 may iteratively adjust at least one WAP position value for the set of WAP objects 352 to generate at least one second trial WAP configuration 371, as described above in relation to FIGS. 1A-1B. In some examples, instructions 128 may iteratively adjust at least one WAP position value for the WAP objects 352 to generate a plurality of second trial WAP configurations 370, including at least second trial WAP configuration 371. In the example of FIG. 3, each of second trial WAP configurations 370 may include at least one WAP setting value 372, 376 for each of WAP objects 352 of site model 201, and WAP position values 374, 378 (e.g., x-axis and y-axis coordinates) for each of WAP objects 352. In some examples, each second trial WAP configuration 370 may include at least a transmit power value for each of the WAP objects 352.

Instructions 124 may generate a coverage prediction for each of the second trial WAP configurations 370 generated by instructions 128 and determine, for each of the coverage predictions, whether the coverage prediction satisfies each of the coverage monitors 240 (e.g., whether the SCIL is zero). Instructions 128 may continue to iteratively generate first second WAP configurations 370 until either instructions 124 determine that a coverage prediction for one of the generated second trial WAP configurations satisfies each of the coverage monitors 240 (e.g., the SCIL is zero), or a threshold number of iterations have been completed without determining that a coverage prediction for any of the generated second trial WAP configurations 370 satisfies each of the coverage monitors 240, as described above in relation to FIGS. 1A-1B.

If instructions 124 determine that a coverage prediction for a selected one of the second trial WAP configurations 370 generated by instructions 128 satisfies each of the plurality of coverage monitors 240 (e.g., has an SCIL of zero), then instructions 124 may identify the set of WAP objects and the selected second trial WAP configuration 370 as a satisfactory WAP arrangement for site model 201. In such examples, instructions 128 may cease iteratively generating second trial WAP configurations 370.

Alternatively, instructions 128 may cease iteratively generating second trial WAP configurations 370 if a threshold number of second trial WAP configurations 370 have been generated without instructions 124 determining that a coverage prediction for any of the generated second trial WAP configurations 370 satisfies each of the coverage monitors 240. In such examples, instructions 124 may further select, as a target WAP configuration, the second trial WAP configuration 370 associated with the coverage prediction having the greatest level of compliance with the coverage monitors 240 (e.g., a lowest SCIL) among the coverage predictions for the second trial WAP configurations 370. Additionally, in some examples, instructions 124 may identify the coverage monitor of the coverage monitors 240 that is least satisfied by (e.g., has a highest CMIL for) a coverage prediction for the target WAP configuration.

In the example of FIG. 3, if respective coverage predictions for the second trial WAP configurations 370 each fail to satisfy at least one the coverage monitors 240, instructions 129 may alter the number of WAP objects in the set of WAP objects in the site model based on the region associated with the identified coverage monitor. For example, if the identified coverage monitor includes a full-coverage parameter, then instructions 129 may add a new WAP object 352 at a center of the region associated with the identified coverage monitor to generate a new set of WAP objects 352. In other examples, if the identified coverage monitor includes a no-coverage parameter, instructions 129 may remove, from the set of WAP objects 352, the WAP object 325 nearest to the region associated with the identified coverage monitor to generate a new set of WAP objects 352. Additionally, in some examples, instructions 129 may add a new WAP object to the set of WAP objects if the set of WAP objects is empty, as described above in relation to FIG. 1A. For example, if the set of WAP objects is empty, then instructions 124 may identify a coverage monitor including a full-coverage parameter, and instructions 129 may add the new WAP object to the center of the region associated with the identified coverage monitor. If there are multiple coverage monitors including a full-coverage parameter, then instructions 124 may identify the coverage monitor associated with the largest region among the coverage monitors including a full-coverage parameter.

In some examples, instructions 124, 126, 128, and 129 may repeat the process described above for generating and evaluating adjusted WAP setting values, adjusting and evaluating adjusted WAP position values, and altering the number of WAP objects until a WAP configuration having a coverage prediction that satisfies each of the coverage monitors 240 is found. In some examples, functionalities described herein in relation to FIG. 3 may be provided in combination with functionalities described herein in relation to any of FIGS. 1-2E and 4-5.

Figure 4:
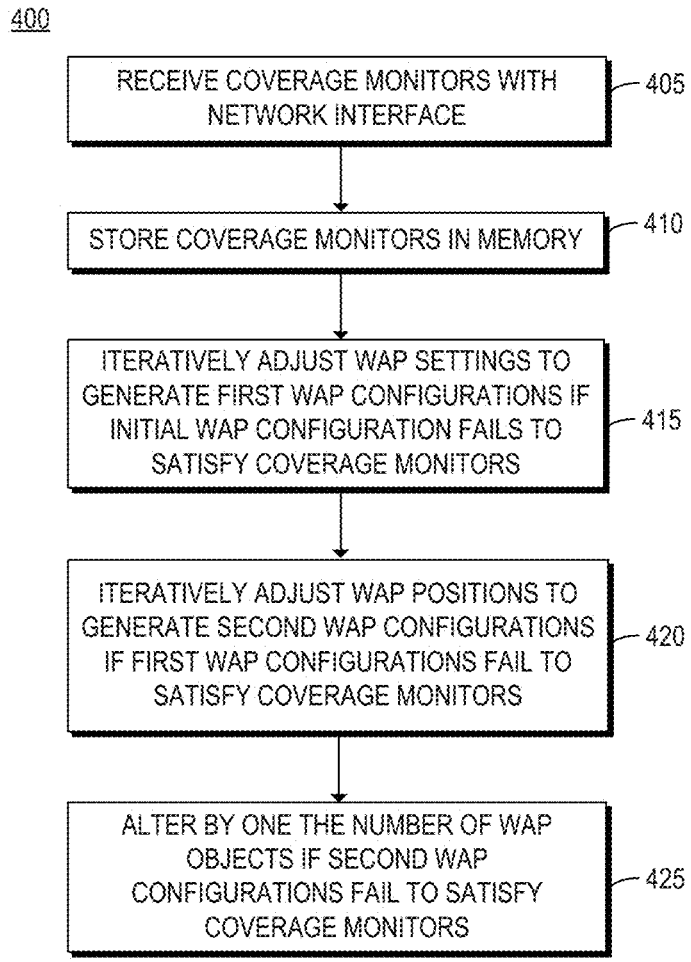
FIG. 4 is a flowchart of an example method for adjusting WAP setting values and WAP position values if coverage monitors for a site model are not satisfied.

FIG. 4 is a flowchart of an example method 400 for adjusting WAP setting values and WAP position values if coverage monitors for a site model are not satisfied. Although execution of method 400 is described below with reference to computing device 300 of FIG. 3, other suitable components for execution of method 400 can be utilized (e.g., computing device 100). Additionally, method 400 may be implemented in the form of executable instructions encoded on a machine-readable storage medium, in the form of electronic circuitry, or a combination thereof.

At 405 of method 400, computing device 300 may receive, with a network interface 318, a plurality of coverage monitors 240, each defining at least one coverage parameter for an associated region of a site model 201. At 410, processor 110 may store the coverage monitors 240 in memory 115 of computing device 300. In some examples, site model may include at least one WAP object. In such examples, computing device 300 may derive an initial WAP configuration for the WAP objects, as described above in relation to FIGS. 1 and 3. Computing device 300 may also generate a coverage prediction for the initial WAP configuration.

At 415, if the coverage prediction for the initial WAP configuration fails to satisfy at least one coverage parameter of at least one of the coverage monitors 240, computing device 300 may iteratively adjust at least one WAP setting value for the set of WAP objects 352, starting from the initial WAP configuration, to generate at least one first trial WAP configuration. In such examples, computing device 300 may use the initial WAP configuration as the preceding WAP configuration for the first iteration of adjusting WAP setting values. In some examples, computing device 300 may also generate a coverage prediction for each of the first trial WAP configurations.

At 420, if a respective first coverage prediction for each first trial WAP configuration fails to satisfy at least one coverage parameter of at least one of the coverage monitors 240, computing device 300 may iteratively adjust at least one WAP position value for the set of WAP objects 352, starting from a selected one of the first trial WAP configurations, to generate at least one second trial WAP configuration. In such examples, the selected one of the first trial WAP configurations may be the first trial WAP configuration having a coverage prediction with a lowest SCIL among the coverage predictions for the first trial WAP configurations. Additionally, in such examples, computing device 300 may use the selected first trial WAP configuration as the preceding WAP configuration for the first iteration of adjusting WAP position values. In some examples, computing device 300 may also generate a coverage prediction for each of the second trial WAP configurations.

At 425, if respective second coverage predictions for the second trial WAP configurations each fail to satisfy at least one coverage parameter of at least one of the coverage monitors 240, computing device 300 may alter by one the number of WAP objects in the set of WAP objects to generate another set of WAP objects. As used herein, to "alter by one" a number of WAP objects in a set of WAP objects is to add one new WAP object to or remove one WAP object from the set of WAP objects.

Figure 5:
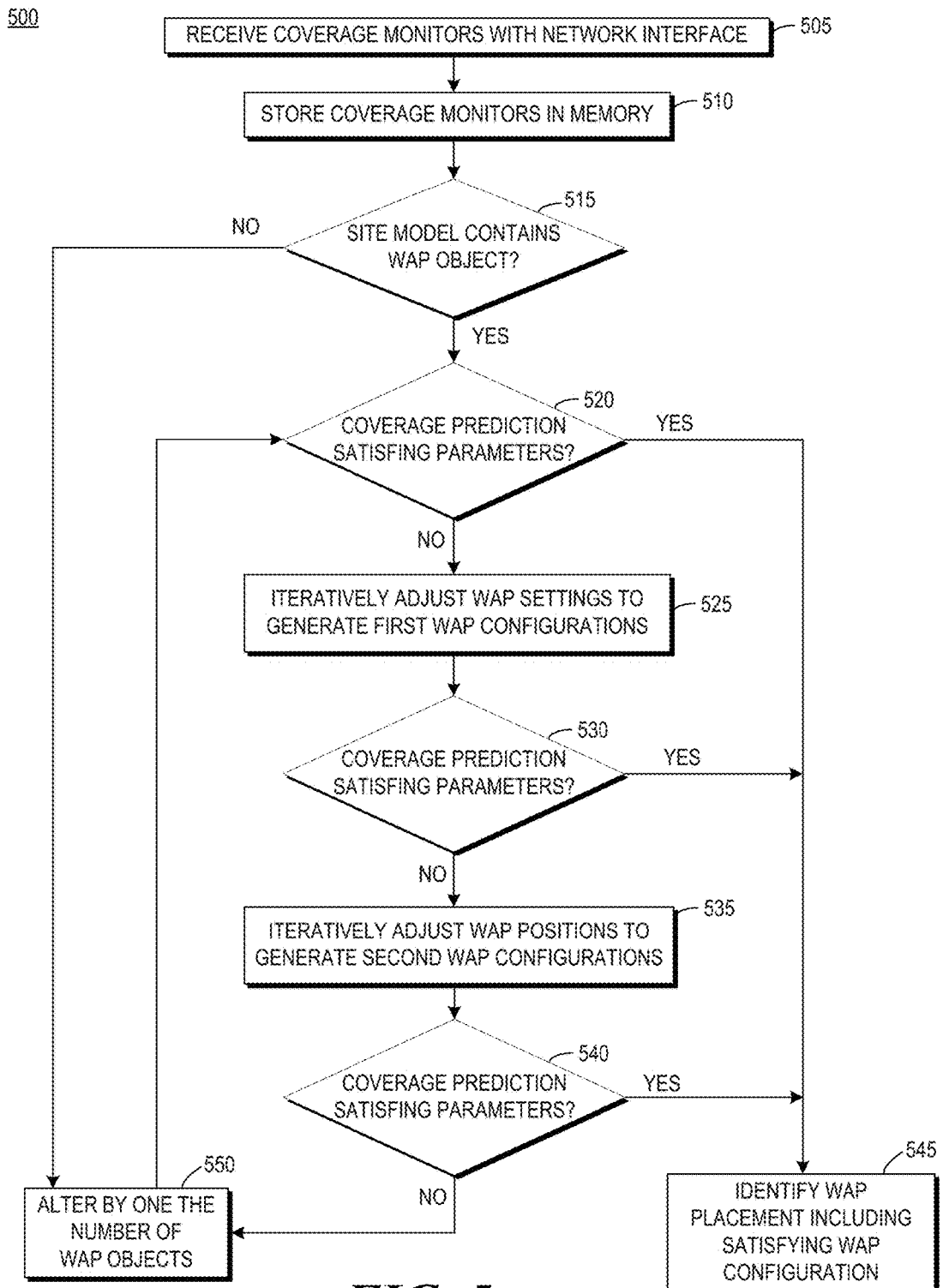
FIG. 5 is a flowchart of an example method for identifying a satisfactory WAP arrangement for a plurality of WAP objects of a site model.

FIG. 5 is a flowchart of an example method 500 for identifying a satisfactory WAP arrangement for a plurality of WAP objects of a site model. Although execution of method 500 is described below with reference to computing device 300 of FIG. 3, other suitable components for execution of method 500 can be utilized (e.g., computing device 100). Additionally, method 500 may be implemented in the form of executable instructions encoded on a machine-readable storage medium, in the form of electronic circuitry, or a combination thereof.

At 505 of method 500, computing device 300 may receive, with a network interface 318, a plurality of coverage monitors 240, each defining at least one coverage parameter for an associated region of a site model 201. At 510, processor 110 may store the coverage monitors 240 in memory 115 of computing device 300. At 515, processor 110 may determine whether site model 201 contains at least one WAP object. If so, then method 500 may proceed to 520. If site model 201 contains no WAP objects, then method 500 may proceed to 550, where processor 110 may add a WAP object to the site model to generate a non-empty set of WAP objects for the site model. In some examples, the added WAP object may be provided with at least one initial WAP setting value and WAP position values. In some examples, computing device 300 may derive an initial WAP configuration for the set of WAP objects of the site model, as described above in relation to FIGS. 1 and 3. Computing device 300 may also generate a coverage prediction for the initial WAP configuration.

At 520, computing device 300 may determine whether the coverage prediction for the initial WAP configuration satisfies each coverage parameter of each of the coverage monitors 240. If so, then computing device 300 may select the initial WAP configuration and method 500 may proceed to 545, where computing device 300 may identify the set of WAP objects and the selected WAP configuration as a satisfactory WAP arrangement. Otherwise, method 500 may proceed to 525, where computing device 300 may iteratively adjust at least one WAP setting value for the set of WAP objects 352, starting from the initial WAP configuration, to generate at least one first trial WAP configuration. Computing device 300 may also generate a coverage prediction for each of the first trial WAP configurations.

At 530, computing device 300 may determine whether any of the coverage predictions for the first trial WAP configurations satisfies each coverage parameter of each of the coverage monitors 240. If so, then computing device 300 may select the first trial WAP configuration for which a coverage prediction satisfied each coverage parameter of each of the coverage monitors 240 and method 500 may then proceed to 545. Alternatively, method 500 may proceed to 535, where computing device 300 may iteratively adjust at least one WAP position value for the set of WAP objects 352, starting from a selected one of the first trial WAP configurations, to generate at least one second trial WAP configuration. In such examples, the selected one of the first trial WAP configurations may be the first trial WAP configuration having a coverage prediction with a lowest SCIL among the coverage predictions for the first trial WAP configurations. Computing device 300 may also generate a coverage prediction for each of the second trial WAP configurations.

At 540, computing device 300 may determine whether any of the coverage predictions for the second trial WAP configurations satisfies each coverage parameter of each of the coverage monitors 240. If so, then computing device 300 may select the second trial WAP configuration for which a coverage prediction satisfied each coverage parameter of each of the coverage monitors 240 and method 500 may proceed to 545. Alternatively, method 500 may proceed to 550, where computing device 300 may alter by one the number of WAP objects in the set of WAP objects to generate new set of WAP objects.

Method 500 may then proceed to 520, where computing device 300 may determine whether a coverage prediction for an initial WAP configuration for the new set of WAP objects satisfies each of the coverage parameters of each of the coverage monitors 240. If so, then method 500 may proceed to 545. If not, then computing device 300 may iteratively adjust WAP settings for the new set of WAP objects to generate a plurality of third trial WAP configurations.

Method 500 may then proceed to 530, where computing device 300 may determine whether a coverage prediction for any of the third trial WAP configurations for the new set of WAP objects satisfies each of the coverage parameters of each of the coverage monitors 240. If so, then method 500 may proceed to 545. If not, then computing device 300 may iteratively adjust WAP positions for the new set of WAP objects to generate a plurality of fourth trial WAP configurations.

Method 500 may then proceed to 540, where computing device 300 may determine whether a coverage prediction for any of the fourth trial WAP configurations for the new set of WAP objects satisfies each of the coverage parameters of each of the coverage monitors 240. If so, then method 500 may proceed to 545. If not, then method 500 may proceed to 550. In this manner, examples described herein may repeat the process described above in relation to 520-550 until a WAP configuration having a coverage prediction that satisfies each coverage parameter of the coverage monitors is identified.

Figure 6:
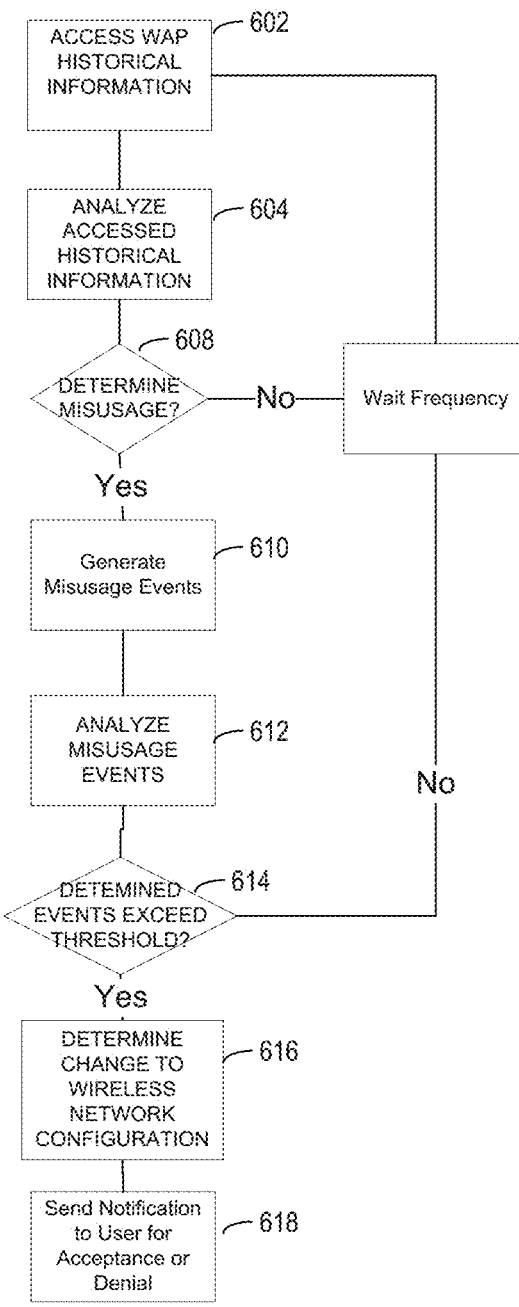
FIG. 6 is a flowchart of an example method for determining a change to a wireless network configuration.

FIG. 6 is a flowchart of an example method 600 for determining a change to a wireless network configuration. Method 600 may be implemented at a computing device as discussed herein. Additionally, method 600 may be implemented in the form of executable instructions encoded on a machine-readable storage medium, in the form of electronic circuitry, or a combination thereof.

As depicted in FIG. 6, historical information may be accessed 602, the historical information relating to one or more WAPs usage within a wireless network. The accessed historical information may be analyzed 604 to determine if a misusage event occurred 608. The historical information may include statistical information that was collected at the WAP. The statistical information may be compared with predetermined acceptable ranges and values as discussed below to determine if a misusage event occurred. This analysis may be performed at the WAP or at a computing device remote from the WAP. If the analysis is performed at the WAP, in at least one embodiment, if a misusage event occurs, a notification may be transmitted to the computing device for storage. This misusage event may be used to later determine if a change to a wireless network configuration is to be determined.

The historical information may relate to various conditions including radio throughput at sampling frequency, a number of associated clients connected to the WAP, transmission errors, etc. Acceptable minimum and maximum values for the different types of historical information may be defined, for example, by an administrator, by a default value based on the type of WAP, etc.

An underusage event may be an event that occurred when a condition fell below the minimum acceptable value. An overusage event may be an event that occurred when a condition exceeded the maximum acceptable value. Misusage events may be determined at the WAP, wherein upon detection of a misusage event, event information is logged 610 including storing state information regarding the state of the wireless network, e.g., the condition causing the misusage event, the number of client devices connected to the WAP, the ratio throughput, etc. In one implementation, a counter may be maintained counting the number of events within a predetermined time interval such that when the number of misusage events exceeds a predetermined number of acceptable misusage events, the computing device may be triggered to generate a change to the configuration of the wireless network. Alternatively, the historical information may be analyzed at a computing device remote from the WAP to identify misusage events.

The time interval during which the historical information is analyzed may be defined by an administrator. For example, historical information collected by a WAP within a one hour time period may be analyzed to determine if any misusage events, including underusage and/or overusage events.

The misusage events may be analyzed 612 in order to determine if the number of determined misusage events exceeds a predetermined number of acceptable misusage events 614. The number of acceptable misusage events may be defined, for example, by an administrator. If the number of determined misusage events does not exceed a predetermined number of acceptable misusage events (614, NO), processing may revert to 602, where historical information for a new time interval may be analyzed.

If the number of determined misusage events exceeds an acceptable number of misusage events (614, YES), then it is determined that a change to the wireless network configuration should be determined. In determining a change to the wireless network, coverage monitors are generated from the historical information and are applied to the processes discussed herein on order to determine the change to the wireless configuration 616.

The determined change to the wireless network configuration may be provided to an administrator 618, as discussed above.

Figure 7A:
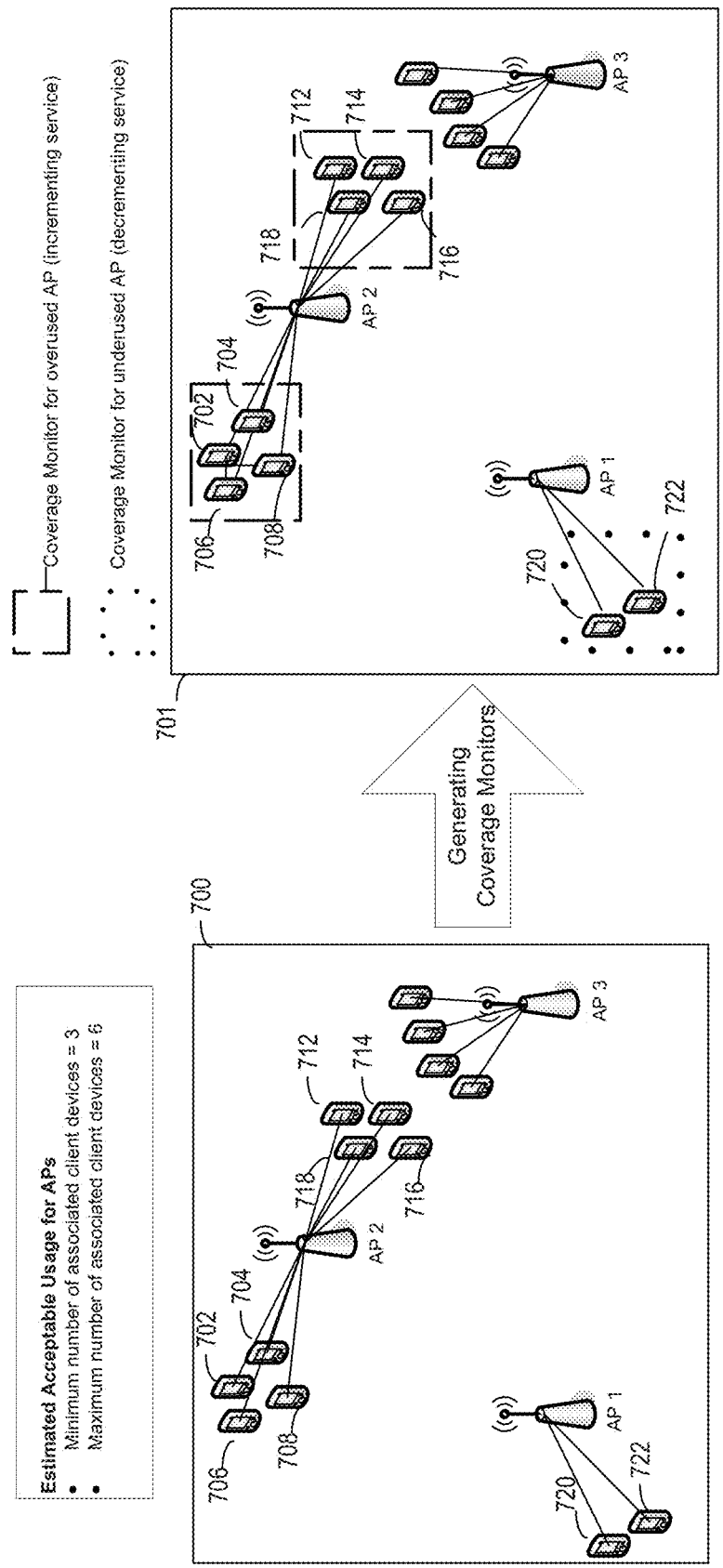
FIGS. 7A and 7B depict instances of a site mode including WAPs and client devices.
Figure 7B:
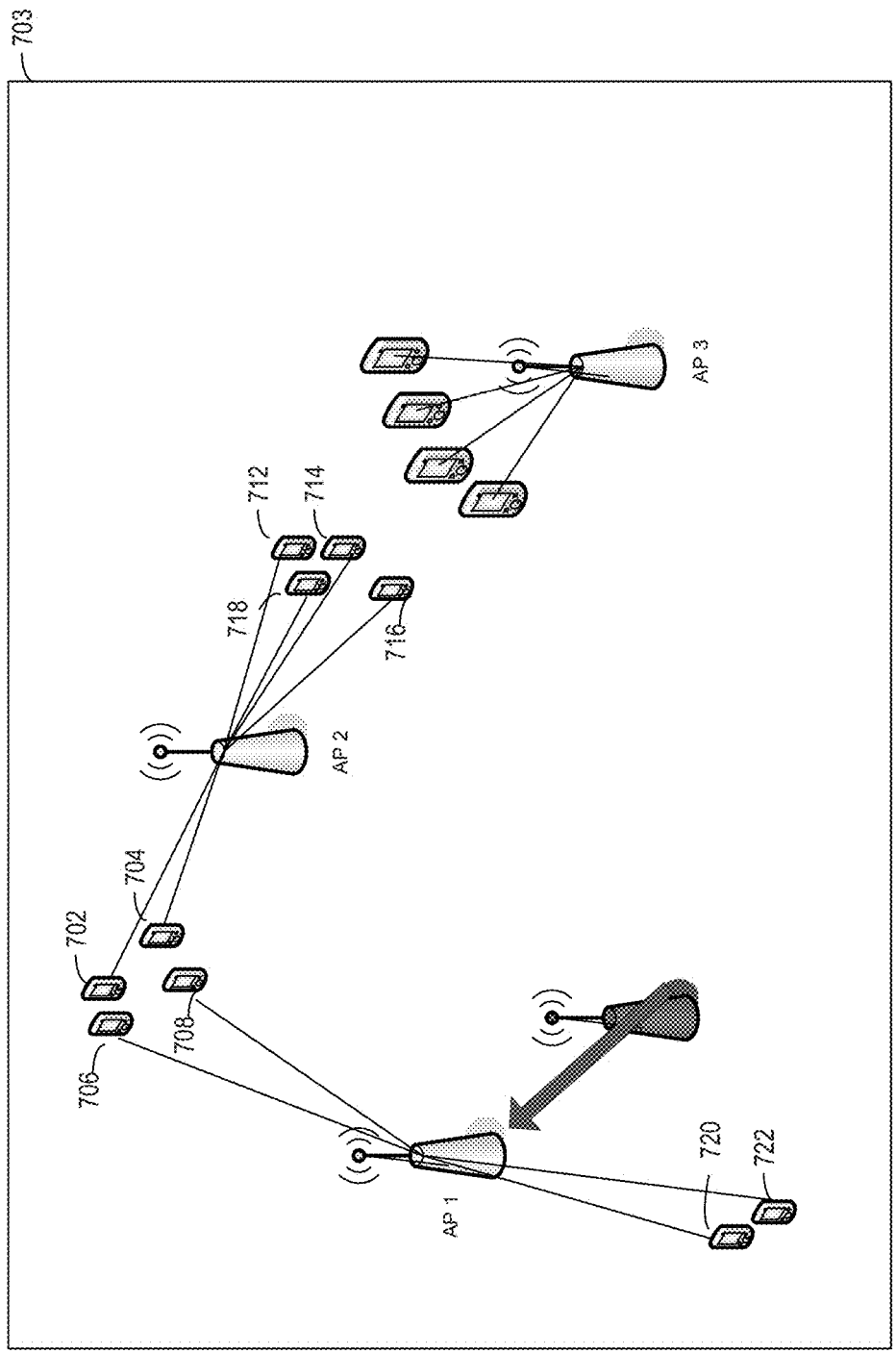

FIGS. 7A and 7B depict diagrams illustrating generation of coverage monitors based on historical information. As shown in FIGS. 7A and 7B, three instances of the same site model are depicted. The site model includes three WAPs, AP1, AP2, and AP3. Each of the WAPS has a plurality of client devices connected to it. For the purposes of explanation of FIGS. 7A and 7B it has already been determined that a number of misusage events has occurred, and that the number of misusage events has exceeded the acceptable number of allowable misusage events.

In site model instance 700, client devices 720 and 722 are connected to AP1, client devices 702, 704, 706, 708, 712, 714, 716, and 718 are connected to AP2, and four computing devices are connected to AP3. After analyzing the historical information, it was determined that the number of overusage misusage events exceeded the acceptable value for AP2. It was also determined that the number of underusage misusage events exceeded the acceptable value for AP1.

In determining coverage monitors for the site model in FIG. 7A, the following process is utilized for each of the overused and underused WAPs. The distance threshold and area threshold are values that are defined by an administrator:

Let $AP_i$ be one AP overused or underused
Let $\Delta$ be a distance threshold
Let A be an area threshold
Let $\Gamma := \emptyset$ be a partition of located wireless clients to $AP_i$
  (Set of clusters
  where each cluster is a set of wireless clients)
Let $\chi$ be a cluster
Let $\Phi := \emptyset$ be the set of coverage monitors to $AP_i$
For each client $\omega$ connected to $AP_i$
  make $\Gamma = \Gamma \cup \{\omega\}$
For each $\varphi \in \Gamma$ For $\psi \in \Gamma$ where $\varphi \neq \psi$
  if $\exists \omega_i \exists \omega_j \ (\omega_i \in \varphi \wedge \omega_j \in \psi \wedge d(\omega_i, \omega_j) \leq \Delta)$
  $\Gamma = \Gamma - \varphi$
  $\Gamma = \Gamma - \psi$
  $\chi = \varphi \cup \psi$
  $\Gamma = \Gamma \cup \chi$
  start loops over As can be seen from the above process, each of the client devices connected to an AP are assigned to their own individual cluster within a set of clusters of the AP. The clusters are compared to determine if they are within a predetermined distance of each other. If they are within a predetermined distance, they are combined into one cluster in the set of clusters. If they are not within the predetermined distance, then they remain in separate clusters. After all of the clusters are compared with each other, coverage monitors are generated for each of the remaining clusters in the set of clusters. The following describes how coverage monitors are generated for each of the clusters in the set of clusters associated with the AP.

For each $\varphi \in \Gamma$
  $\sigma := $ A coverage monitor
  $\sigma \rightarrow $ region $:= \{(x_1, y_1), (x_2, y_2) | \forall \omega \in \varphi \ x_1 \leq x_{107} \wedge x_{107} \leq x_2 \wedge y_1 \leq y_\omega \wedge y_\omega \leq y_2\}$
  if(area($\sigma \rightarrow $region)>A)
    $\sigma \rightarrow $coverageType:=COVERAGE
    $\sigma \rightarrow $minClients:=|$\varphi$|/misuageEventCount
    $\sigma \rightarrow $minDataRate:=Average defined by the AP configuration
    $\Phi = \Phi \cup \sigma$
return $\Phi$ As can be seen from the process noted above, for each cluster, the x and y coordinate positions of each of the client devices are determined and compared with each other in order to identify a minimum region that encompasses all of the client devices in the cluster. If the region is sufficiently large, this minimum region is stored as the region associated with the cluster and coverage parameters may be determined for the coverage monitor. The coverage type of each of the clusters is specified. For the purposes discussed herein, the coverage type may be "coverage". The minimum number of clients is determined as the average: the number of client devices that belong to the coverage monitor's region (or cluster) divided by the number of misusage events, as the number of connected client devices to $AP_i$ is an aggregation of all of the client devices from all of the misusage events. The minimum data rate for the region may be calculated based on an average defined by the AP configuration, set by an administrator, set by default, etc.

As can be seen in FIG. 7A, client devices 702, 704, 706 and 708 have been identified as a cluster as they are within a predetermined distance of each other. Computer devices 720 and 722 have been identified as a cluster as they are within a predetermined distance of each other. Client devices 712, 714, 716 and 718 have been identified as a cluster as they are within a predetermined distance of each other. Coverage parameters including the associated region, coverage type, minimum number of clients and minimum data rate may be determined in accordance with the process noted above for each of the clusters and stored as a coverage monitor in storage.

The coverage monitors and the associated coverage parameters may be used, as noted above, to determine the change to the configuration of the wireless network. FIG. 7B depicts instance 703 of the site model after the change to the configuration of the wireless network has been determined. As can be seen in FIG. 7B, the determined change to the configuration of the wireless network is an external change wherein AP1 is moved to a new position in order that client devices 706 and 708 are connected to AP1, instead of AP2.

What is claimed is:

1. A non-transitory machine-readable storage medium, storing instructions which, when executed by a processor of a computing device, cause the computer device to:
   determine if a change to a wireless network configuration should be determined; if it is determined that the change to the wireless network configuration should be determined,
   generate a plurality of coverage monitors within a site model, each coverage monitor specifying at least one coverage parameter for an associated region of the site model;
   determine the change to the wireless network configuration by:
      iteratively adjust at least one wireless access point (WAP) setting value to generate at least one first trial WAP configuration; and
      iteratively adjust at least one WAP position value to generate at least one second trial WAP configuration if, for each first trial WAP configuration, a respective first coverage prediction fails to satisfy at least one of the coverage parameters;
   determine an alteration to a number of WAPs if, for each second trial WAP configuration, a second coverage prediction fails to satisfy at least one of the coverage parameters;
   identify the alteration as part of the change to the wireless network configuration;
   provide the change to the wireless network configuration to a display device; and
   modify the wireless network configuration based on the change, upon receipt of a user authorization of the alteration.

2. The non-transitory machine-readable storage medium of claim 1, further including instructions to:
   access, with the processor, a historical information related to access point usage within the wireless network configuration to determine if a misusage event occurred;
   analyze the historical information of a WAP within the wireless network configuration to determine if a number of misusage events in a predetermined time interval is outside a predetermined range of acceptable misusage events; and
   determine that the change to the wireless network configuration should be determined when the number of misusage events within the predetermined time interval is outside the predetermined range of acceptable misusage events.

3. The non-transitory machine-readable storage medium of claim 2, further including instructions to:
   identify at least one client device that are within a predetermined distance of other client devices and are directly connected to the WAP that the historical information was analyzed; and
   generate a coverage monitor for the client device within a predetermined distance of a different client device.

4. The non-transitory machine-readable storage medium of claim 3, further including instructions to:
   determine a region including an x coordinate position and a y coordinate position, the associated region representing a minimum region within a site map that includes multiple client devices; and
   specify at least one coverage parameter for the associated region of the site model, the at least one coverage parameter including at least one of a minimum number of client devices and a minimum data rate.

5. The non-transitory machine-readable storage medium of claim 1, further including instructions to:
   determine that change in configuration of the at least one WAP should include a change to an internal configuration of the at least one WAP.

6. The non-transitory machine-readable storage medium of claim 1, further including instructions to determine that change in configuration of the at least one WAP should include a change to an external configuration of the at least one WAP.

7. The non-transitory machine-readable storage medium of claim 1, further including instructions to:
   select the second trial WAP configuration associated with the second coverage prediction having a greatest level of compliance with the coverage monitors among the second coverage prediction for the at least one second trial WAP configuration, if each second coverage prediction fails to satisfy at least one coverage parameter; and
   identify the coverage monitor, among the plurality of coverage monitors, that is least satisfied by the second coverage prediction for the selected second trial WAP configuration.

8. A computing device, comprising:
   a memory encoded with multiple instructions; and
   a processor to execute the instructions, wherein the instructions, when executed, cause the processor to:
   determine that a change to a wireless network configuration should be determined;
   iteratively adjust at least one wireless access point (WAP) setting value for a set of WAP objects to generate at least one first trial WAP configuration, if an initial coverage prediction for an initial WAP configuration for the set of WAP objects fails to satisfy at least one of a plurality of coverage monitors;
   iteratively adjust at least one WAP position value for the set of WAP objects to generate at least one second trial WAP configuration if, for each first trial WAP configuration, a first coverage prediction fails to satisfy at least one of the coverage monitors;
   identify the coverage monitor least satisfied by a coverage prediction for a target WAP configuration if, for each second trial WAP configuration, a second coverage prediction fails to satisfy at least one of the coverage monitors;
   alter a number of WAP objects in the set of WAP objects based on a region associated with the coverage monitor, wherein the change to the wireless network configuration includes identification of an alteration in the number of WAP objects;
   provide the change to the wireless network configuration to a display device; and
   modify the wireless network configuration based on the change, upon receipt of a user authorization of the alteration of the number of WAP objects.

9. The computing device of claim 8, further comprising:
   a network interface, wherein the instructions, when executed, further cause the processor to: receive, with the network interface, a set of WAP objects and an initial WAP configuration; and
   select, as the target WAP configuration, the second trial WAP configuration associated with the second coverage prediction having a greatest level of compliance with the coverage monitors among the second coverage prediction for the at least one second trial WAP configuration.

10. The computing device of claim 9, wherein the instructions, when executed, further cause the processor to:
identify the set of WAP objects and a selected one of the at least one first trial WAP configuration as a satisfactory WAP arrangement for a site model if the first coverage prediction for the first trial WAP configuration satisfies each coverage parameter of each of the coverage monitors; and
identify the set of WAP objects and a selected one of the at least one second trial WAP configuration as a satisfactory WAP arrangement for the site model if the second coverage prediction for the second trial WAP configuration satisfies each coverage parameter of each of the coverage monitors.

11. The computing device of claim 8, wherein the instructions, when executed, further cause the processor to:
identify at least one client device within a predetermined distance of a second client device and are directly connected to the WAP that a historical information was analyzed; and
generate a coverage monitor for the client device within a predetermined distance of a different client device.

12. The computing device of claim 8, the processor further configured to:
access, within a wireless network, historical information related to wireless access point (WAP);
analyze the historical information to determine if a number of misusage events in a predetermined time interval is outside a predetermined range of acceptable misusage events;
determine that the change to the wireless network configuration should be determined when the number of misusage events within the predetermined time interval is outside the predetermined range of acceptable misusage events; and
determine the change to the wireless network configuration based on at least one coverage monitor that was generated based on the historical information of the WAP, the coverage monitor specifying at least one coverage parameter for an associated region on a site model.

13. A method comprising:
determining that a change to a wireless network configuration should be determined when a number of misusage events within a predetermined time interval is a predetermined range of acceptable misusage events, the number of misusage events calculated based on a historical information collected from a wireless access point (WAP) in an network;
generating at least one coverage monitor based on the historical information, the coverage monitor specifying at least one coverage parameter for an associated region on a site model; and
determining the change to the wireless network configuration by:
adjusting iteratively at least one WAP setting value for a set of (WAP) objects, starting from an initial WAP configuration for the set of WAP objects, to generate at least one first trial WAP configuration, if a coverage prediction for the initial WAP configuration fails to satisfy at least one coverage parameter of at least one of the coverage monitors;
adjusting iteratively at least one WAP position value for the set of WAP objects, starting from a selected first trial WAP configuration, to generate at least one second trial WAP configuration if, for each first trial WAP configuration, a respective first coverage prediction fails to satisfy at least one coverage parameter of at least one of the coverage monitors;
altering by one a number of WAP objects in the set of WAP objects to generate another set of WAP objects if, for each second trial WAP configuration, a respective second coverage prediction fails to satisfy at least one coverage parameter of at least one of the coverage monitors; providing the change to the wireless network configuration including the alteration of the number of WAP objects to a display device; and
modifying the wireless network configuration based on the change, upon receipt of a user authorization of the alteration.

14. The method of claim 13, further comprising:
identify at least one client device that is within a predetermined distance of other client devices and are directly connected to the WAP that the historical information was analyzed;
determine a region including an x coordinate position and a y coordinate position, the associated region representing a minimum region within a site map that includes the client device; and
specifying at least one coverage parameter for the associated region of the site model, the at least one coverage parameter including at least one of a minimum number of client devices and a minimum data rate.

* * * * *